United States Patent
Agrawal et al.

(10) Patent No.: US 11,657,421 B2
(45) Date of Patent: May 23, 2023

(54) METHOD AND SYSTEM FOR FACILITATING ELECTRONIC TRANSACTIONS

(71) Applicant: Mastercard International Incorporated, Purchase, NY (US)

(72) Inventors: Rahul Agrawal, Pune (IN); Sudhir Gupta, Pune (IN); Harsh Piparsaniya, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 17/715,442

(22) Filed: Apr. 7, 2022

(65) Prior Publication Data

US 2022/0230197 A1 Jul. 21, 2022

Related U.S. Application Data

(63) Continuation of application No. 16/528,012, filed on Jul. 31, 2019, now Pat. No. 11,328,312.

(30) Foreign Application Priority Data

Aug. 2, 2018 (SG) .......................... 10201806607Q

(51) Int. Cl.
*G06Q 30/02* (2023.01)
*G06Q 30/0207* (2023.01)
*G06Q 20/36* (2012.01)
*G06Q 30/0226* (2023.01)

(52) U.S. Cl.
CPC ......... *G06Q 30/0222* (2013.01); *G06Q 20/36* (2013.01); *G06Q 30/0233* (2013.01)

(58) Field of Classification Search
CPC .... G06Q 30/02; G06Q 30/0222; G06Q 20/36; G06Q 30/0233; G06Q 20/102; G06Q 20/227; G06Q 30/0207–30/0277
See application file for complete search history.

(56) References Cited

U.S. PATENT DOCUMENTS

| | | | | |
|---|---|---|---|---|
| 7,499,875 B1* | 3/2009 | May | ..................... | G06Q 20/381 705/40 |
| 8,396,794 B1* | 3/2013 | Mo | ........................ | G06Q 20/10 705/40 |
| 8,577,345 B2* | 11/2013 | Dragt | .................... | G06Q 30/02 455/414.2 |
| 9,836,732 B1* | 12/2017 | Mocko | ................. | G06Q 20/102 |

(Continued)

*Primary Examiner* — Thuy N Nguyen
(74) *Attorney, Agent, or Firm* — Hovey Williams LLP

(57) ABSTRACT

A method for facilitating transactions is provided. Various users register their payment modes to avail a payment mode interchange service offered by a server for online purchases. During registration, the users specify corresponding offer amounts in exchange for allowing purchases of other users to be performed by using their payment modes. When an offer on a purchase is not applicable on a payment mode of a first user, the first user is recommended by the server to make the purchase by using a payment mode of a second user on which the offer is applicable. The payment mode of the second user is charged with a purchase amount of the purchase and the offer amount specified by the second user is billed on the payment mode of the first user. The second user receives the offer amount and the first user receives an incentive associated with the offer.

20 Claims, 19 Drawing Sheets

(56) References Cited

U.S. PATENT DOCUMENTS

| | | | | |
|---|---|---|---|---|
| 10,580,027 B1* | 3/2020 | Rephlo | ............... | G06Q 20/405 |
| 11,157,933 B2* | 10/2021 | Babaria | ............. | G06Q 30/0225 |
| 2005/0144100 A1* | 6/2005 | Shapiro | ................. | G06Q 40/02 |
| | | | | 705/35 |
| 2010/0082445 A1* | 4/2010 | Hodge | .................. | G06Q 20/20 |
| | | | | 705/35 |
| 2012/0197731 A1* | 8/2012 | Rampell | ............. | G06Q 20/14 |
| | | | | 705/14.64 |
| 2012/0323669 A1* | 12/2012 | Kohlmeier | ............ | G06Q 30/02 |
| | | | | 705/14.38 |
| 2014/0222663 A1* | 8/2014 | Park | .................... | G06Q 20/027 |
| | | | | 705/39 |
| 2015/0088629 A1* | 3/2015 | Dubey | .................. | G06Q 20/12 |
| | | | | 705/14.23 |
| 2015/0088755 A1* | 3/2015 | Sobel | .................... | G06Q 20/20 |
| | | | | 705/71 |
| 2015/0254698 A1* | 9/2015 | Bondesen | ............. | G06Q 20/36 |
| | | | | 705/14.17 |
| 2015/0348006 A1* | 12/2015 | Taveau | ............... | G06Q 20/3224 |
| | | | | 455/456.2 |
| 2016/0012465 A1* | 1/2016 | Sharp | ................... | G06Q 20/321 |
| | | | | 705/14.17 |
| 2016/0071156 A1* | 3/2016 | Li | ........................ | G06Q 20/387 |
| | | | | 705/14.64 |
| 2016/0078465 A1* | 3/2016 | Chai | ...................... | H04N 21/4784 |
| | | | | 705/14.27 |
| 2016/0171570 A1* | 6/2016 | Dogin | ................ | G06Q 30/0633 |
| | | | | 705/26.2 |
| 2016/0260084 A1* | 9/2016 | Main | .................... | G06Q 20/401 |
| 2016/0292668 A9* | 10/2016 | Laracey | ............ | G06Q 20/3276 |
| 2017/0161697 A1* | 6/2017 | Clark | ................... | G06Q 20/102 |
| 2017/0193485 A1* | 7/2017 | Wu | .................... | G06Q 30/0226 |
| 2018/0137530 A1* | 5/2018 | Wheeler | ............ | G06Q 30/0207 |
| 2018/0204197 A1* | 7/2018 | Guyot | .................... | G06Q 20/20 |
| 2018/0341933 A1* | 11/2018 | Renke | .................... | G06Q 40/02 |
| 2021/0166260 A1* | 6/2021 | Ho | ...................... | G06Q 30/0233 |

* cited by examiner

METHOD AND SYSTEM FOR FACILITATING ELECTRONIC TRANSACTIONS

CROSS REFERENCE TO RELATED APPLICATIONS

This is a continuation of U.S. patent application Ser. No. 16/528,012, filed Jul. 31, 2019, and titled METHOD AND SYSTEM FOR FACILITATING ELECTRONIC TRANSACTIONS, which, itself claims priority to Singaporean Application Serial No. 10201806607Q, filed Aug. 2, 2018. Each of the listed earlier-filed applications are incorporated herein by reference in their entireties.

FIELD OF THE INVENTION

The present invention relates to a method and a system for conducting electronic transactions, and more particularly to a method and a system for facilitating transactions for online purchases.

BACKGROUND

Market penetration always remains a key performance metric to measure business growth for any business. Hence, most business strategies of various business owners, including merchants, aim at increasing their market penetration. Examples of various business strategies adopted by the merchants include competitive pricing, enhanced marketing communications, offers on purchases. From these business strategies, distribution of offers is the most common approach adopted by the merchants to entice customers. Examples of the offers include cashbacks, discounts, reward points, or loyalty points.

Typically, such offers are applicable only on specific transaction cards or electronic wallets (e-wallets) at any point of time. It is not practical for a customer, who wishes to avail an offer at a particular time, to possess all the transaction cards or e-wallets on which such offers are applicable. Hence, in such a scenario, the customer may miss out on some lucrative offers that a merchant is offering on specific categories, types, or brands of the transaction cards or e-wallets. For example, a customer wants to recharge his phone from a particular merchant. The customer at that point of time has, let us say, a Google® wallet to pay for the recharge. However, the merchant is offering a cashback of $2 on a recharge of $15 through a PayPal® wallet. In this scenario, the customer will not be able to avail the benefit associated with the offer, since she does not have the PayPal wallet. In a similar scenario, a customer wants to recharge his phone from a particular merchant. The customer at that point of time possess, let us say, an HSBCx credit card to pay for the recharge. However, the merchant is offering a cashback of $2 on a recharge of $15 through a Citibank® credit card. In this scenario, the customer will not be able to avail the benefit associated with the offer, since she does not possess the Citibank credit card.

In light of the foregoing, there exists a need for a solution that enables a customer to avail benefits that are applicable on select transaction cards or e-wallets even when the customer does not possess the select transaction cards or e-wallets.

SUMMARY

In an embodiment of the present invention, a method for processing transactions is provided. One or more payment modes relevant to a purchase that a first user wants to make are identified, by circuitry of a server, based on an offer associated with the purchase. One or more payment options associated with the one or more payment modes, respectively, are presented by the circuitry to the first user by way of a user interface rendered on a user device of the first user. The one or more payment options are selectable by the first user. A selection that corresponds to a first payment option of the one or more payment options is received by the circuitry. The first payment option is associated with a first payment mode of a second user, such that the one or more payment modes include the first payment mode. A second payment mode of the first user is charged with a first offer amount associated with the first payment option, based on the selection. A transaction is initiated from the first payment mode for billing a purchase amount of the purchase on the first payment mode, when the first offer amount is charged. The first user receives an incentive associated with the offer, when the transaction is complete.

In another embodiment of the present invention, a system for processing transactions is provided. The system includes a payment network server that includes circuitry. The circuitry is configured to identify one or more payment modes relevant to a purchase that a first user wants to make, based on an offer associated with the purchase. The circuitry presents one or more payment options associated with the one or more payment modes, respectively, to the first user by way of a user interface rendered on a user device of the first user. The one or more payment options are selectable by the first user. The circuitry receives a selection that corresponds to a first payment option of the one or more payment options from the user device. The first payment option is associated with a first payment mode of a second user, such that the one or more payment modes include the first payment mode. The circuitry charges a second payment mode of the first user with a first offer amount associated with the first payment option, based on the selection. The circuitry initiates a transaction from the first payment mode for billing a purchase amount of the purchase on the first payment mode, when the first offer amount is charged. The first user receives an incentive associated with the offer, when the transaction is complete.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present invention are illustrated by way of example, and not limited by the appended figures, in which like references indicate similar elements.

Figure 1:
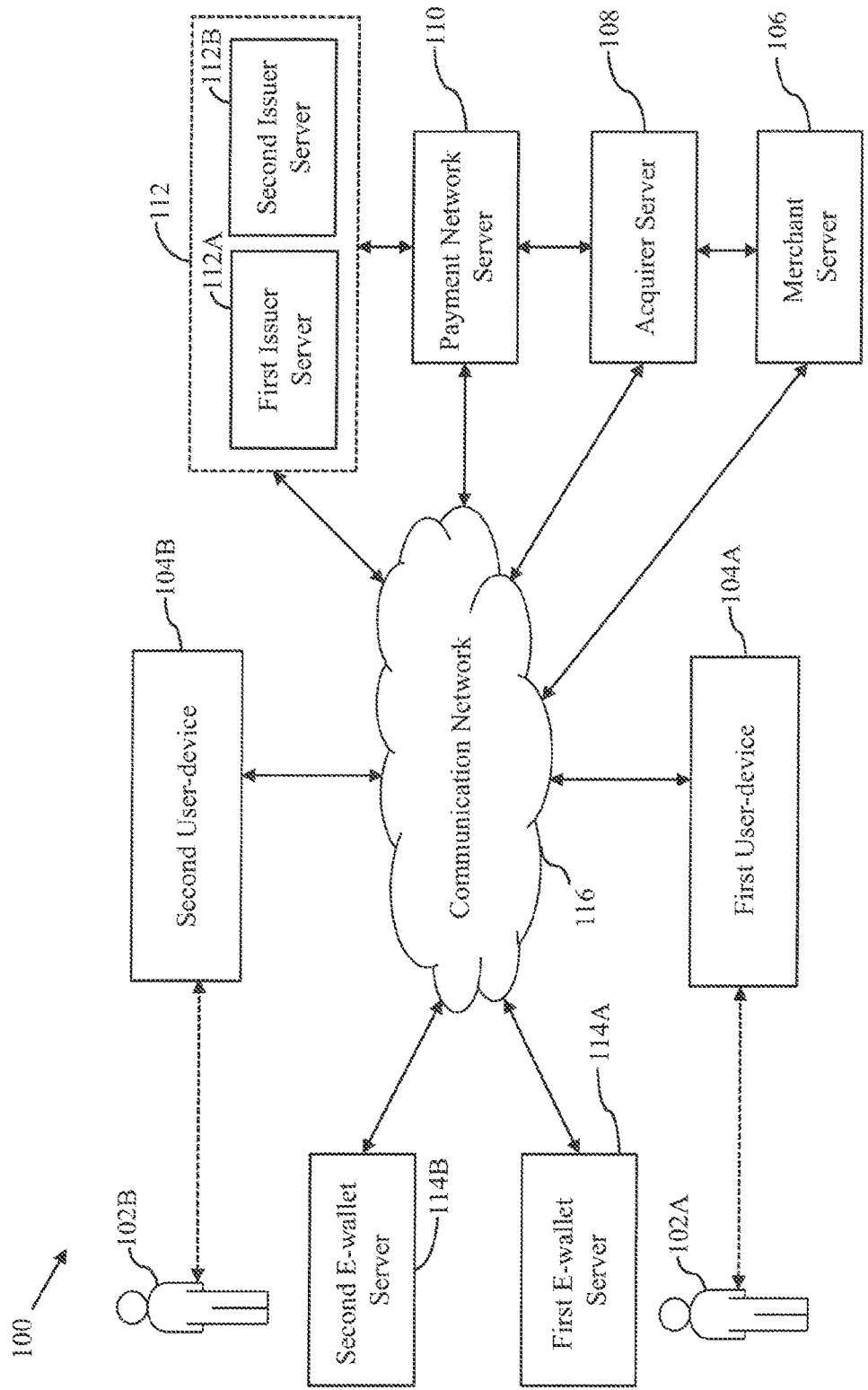
FIG. 1 is a block diagram that illustrates a communication environment for facilitating electronic transactions, in accordance with an embodiment of the present invention.

Further areas of applicability of the present invention will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

The present invention is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

Various embodiments of the present invention provide a method and a system for facilitating transactions for online purchases. A server hosts a mobile application or a website to offer a payment mode interchange service to users for making online purchases. Examples of the server includes a payment network server, an issuer server, or a third-party server. The users are required to register their corresponding payment modes with the server for availing the payment mode interchange service. For example, a first user registers a first payment mode (such as a transaction card or an electronic wallet (e-wallet)) with the server. During registration, the first user blocks an amount (hereinafter referred to as "first block amount") from a user account linked to the first payment mode and submits a first payment option indicating a first offer amount that the first user wants in exchange for allowing the server to use the first payment mode for a purchase of another user. In one example, the first payment option is "1.10× in exchange for 1×", i.e., the first user demands 1.10 times of the purchase amount if the server uses the first payment mode to make a purchase for another user. Since multiple users register with the server, the server maintains a pool of registered payment modes and the corresponding payment options.

After registration, the first user accesses the mobile application or the website to make a purchase from a merchant listed on the mobile application or the website. The first user selects an item for purchase. The merchant may have provided an offer on the sale of the selected item which is applicable on a specific category, type, or brand of a payment mode. For example, the offer is a cashback of $20 when a "Type-1" payment mode is used to purchase the selected item. The server checks the offer and determines that none of the registered payment modes of the first user satisfy the offer. In such a scenario, the server identifies payment modes (for example "Type-1" payment modes) from the pool of registered payment modes that are relevant to the purchase of the selected item as per the offer. The server presents the payment options that correspond to the identified payment modes to the first user. The first user may compare all the payment options and may select one of the presented payment options to make the purchase. For example, the first user selects a second payment option as submitted by a second user for the use of her payment mode (i.e., a second payment mode). The server communicates an authorization request to the first user to deduct a second offer amount listed in the second payment option from the first block amount of the first user. When the first user approves the deduction of the second offer amount, the server deducts the second offer amount from the first block amount of the first user. The server further communicates a permission request to the second user to allow the use of the second payment mode for making a purchase of the item selected by the first user. When the second user approves the use of the second payment mode for the purchase, the server bills a purchase amount of the purchase on the second payment mode. The server ensures that the second user receives the second offer amount as demanded by her and the first user receives the incentive (for example, $20 cashback) offered by the merchant on the sale of the selected item. The method and system as described in the foregoing may be implemented by payment networks, issuer banks, or third-party service providers that coordinate with various e-wallets providers, issuer banks, merchants, and payment networks.

Thus, the method and system of the present invention enables the first user to avail the offer offered by the merchant on the specific category, brand, or type of the payment mode, even when the first user does not possess the specific category, brand, or type of the payment mode. The method and system are beneficial for both the first user who makes the purchase and the second user whose payment mode is selected for making the purchase, as the first user gets the incentive and the second user earns a profit based on the second offer amount. The method and system are further beneficial for the issuers of the payment modes and the merchants as it increases their business.

Terms Description (in Addition to Plain and Dictionary Meaning)

Server is a physical or cloud data processing system on which a server program runs. A server may be implemented in hardware or software, or a combination thereof. In one embodiment, the server is implemented as a computer program that is executed on programmable computers, such as personal computers, laptops, or a network of computer systems. The server may correspond to a merchant server, an acquirer server, a payment network server, or an issuer server.

Merchant is an entity that offers various products and/or services in exchange of payments. The merchant may establish a merchant account with a financial institution, such as a bank (hereinafter "acquirer bank") to accept the payments from several users by use of one or more payment modes. The merchant further provides one or more offers (such as cashback, reward points, loyalty points, discounts, or the like) on the sale of the products and/or services.

Issuer or issuer bank is a financial institution, such as a bank, where accounts of several users are established and maintained. The issuer bank ensures payment for authorized transactions in accordance with various payment network regulations and local legislation. In one embodiment, the issuer bank facilitates transactions for online purchases.

Payment network is a transaction card association that acts as an intermediate entity between acquirer banks and issuer banks to authorize and fund transactions. Examples of payment networks include MasterCard®, American Express®, VISA®, Discover®, Diners Club®, and the like. The payment network settles the transactions between various acquirer banks and issuer banks, when transaction cards are used for initiating transactions. For example, if a user uses a stolen debit card for performing a transaction, the payment network does not authorize the transaction. In one embodiment, the payment network facilitates transactions for online purchases.

Payment mode refers to a means of payment using which a user performs transactions for various purchases. Examples of the payment mode includes a transaction card or an e-wallet. The transaction card is a payment device, such as a debit card, a credit card, a prepaid card, a promotional card, a contactless card, and/or other device that may hold identification information of an account. The transaction card can be used to perform transactions, such as deposits and withdrawals, credit transfers, purchase payments, and the like. In an embodiment, the transaction card may be radio frequency identification (RFID) or NFC enabled for performing contactless payments. The e-wallet refers to a digital wallet that holds electronic cash. The e-wallet can be used to perform transactions for various purchases.

Payment option indicates an offer amount that a user wants in exchange for allowing another user to use her payment mode for making purchases. For example, a first user may submit a payment option as "$120 in exchange for paying $100 from a first payment mode". In this example, the first payment mode belong to the first user and the first user is offering to pay $100 for a purchase of a second user from her first payment mode if she gets $120 from the second user. In this scenario, "$120" corresponds to the offer amount of the first user.

Offers are deals that are offered by a merchant on the sale of products and/or services. The offers include a cashback, reward points, discount, loyalty points, or the like. Typically, an offer is applicable on a specific category, type, or brand of a payment mode used for purchasing the products and/or services from the merchant.

Relevant payment modes refer to those payment modes on which an offer offered by a merchant is applicable. For example, when the offer is "a cashback of $15 on a purchase made by using a PayPal wallet", all PayPal wallets serve as relevant payment modes.

FIG. 1 is a block diagram that illustrates a communication environment 100 for facilitating electronic transactions, in accordance with an embodiment of the present invention. The communication environment 100 includes a first user 102A in possession of a first user-device 104A and a second user 102B in possession of a second user-device 104B. The communication environment 100 further includes a merchant server 106, an acquirer server 108, a payment network server 110, first and second issuer servers 112A and 112B (hereinafter collectively referred to as "issuer servers 112"), and first and second electronic wallet (e-wallet) servers 114A and 114B. The first user-device 104A communicates with the merchant server 106, the payment network server 110, the first issuer server 112A, and the first e-wallet server 114A by way of a communication network 116. The second user-device 104B communicates with the merchant server 106, the payment network server 110, the second issuer server 112B, and the second e-wallet server 114B by way of the communication network 116. Further, the merchant server 106, the acquirer server 108, the payment network server 110, the issuer servers 112, and the first and second e-wallet servers 114A and 114B may communicate with each other by way of the communication network 116 or through separate communication networks established therebetween.

The first user 102A is an individual, who is an account holder of a first user account. In one embodiment, the first user account is a bank account maintained by a financial institution, such as a first issuer bank. The first issuer bank may have issued a first transaction card to the first user 102A for performing transactions from the first user account. The first transaction card is linked to the first user account and stores identification information of the first user account (hereinafter referred to as "account identification information of the first user account") in form of an electronic chip or a machine readable magnetic strip. The account identification information may include an account number, a name of an account holder (i.e., the first user 102A), or the like. The first transaction card further has a unique card number, an expiry date, a card security code, and a card type associated to it. The unique card number, the expiry date, the card security code, and the card type correspond to details of the first transaction card. In one scenario, the first transaction card is a physical card, such as a credit card, a debit card, a membership card, a charge card, an electronic cash card, a gift card, or the like. In another scenario, the first transaction card may be a virtual transaction card that is stored in a memory (not shown) of the first user-device 104A of the first user 102A. In another embodiment, the first user account is a first e-wallet account maintained by a first e-wallet service provider. In such a scenario, the first e-wallet account is linked to a first e-wallet that is loaded with electronic cash. The first transaction card or the first e-wallet corresponds to a first payment mode of the first user 102A.

Similarly, the second user 102B is an account holder of a second user account. The first and second user accounts are two different accounts of two different users. In one embodiment, the second user account is maintained by a second issuer bank, such that the first and second issuer banks are different. The second issuer bank may have issued a second transaction card to the second user 102B. The second transaction card is linked to the second user account and stores account identification information of the second user account. It will be apparent to a person skilled in the art that the second transaction card is functionally similar to the first transaction card. Similarly, in another embodiment, the second user account may be a second e-wallet account maintained by a second e-wallet service provider. In such a scenario, the second e-wallet account is linked to a second e-wallet that is loaded with electronic cash. The second transaction card or the second e-wallet corresponds to a second payment mode of the second user 102B. The first and second payment modes are different and correspond to two different users.

The first user-device 104A is a communication device of the first user 102A. The first user 102A uses the first user-device 104A for accessing a mobile application or a website to register the first payment mode for performing electronic transactions. The mobile application and the website offer a payment mode interchange service to the first user 102A for making online purchases from merchants. The mobile application may be installed on the memory of the first user-device 104A. The first website is accessed by way of a browser installed on the memory of the first user-device 104A. The mobile application and the website may be hosted by one of the payment network server 110, the first and second issuer servers 112A and 112B, or a third-party server that aggregates various payment networks, issuer banks, and merchants. The first user 102A further uses the first user-device 104A to view credit and debit notifications corresponding to the first user account.

Similarly, the second user-device 104B is a communication device of the second user 102B. The second user 102B may also use the second user-device 104B for accessing the mobile application or the website to register the second payment mode for performing electronic transactions. It will be apparent to a person skilled in the art that the second user-device 104B is functionally similar to the first user-device 104A. Examples of the first and second user-devices 104A and 104B include, but are not limited to, a mobile phone, a smartphone, a laptop, a tablet, a phablet, or any other communication device.

The merchant server 106 is a computing server or a payment gateway server that is associated with a merchant. The merchant may establish a merchant account with a financial institution, such as an acquirer bank, to accept payments for products and/or services purchased and/or availed by various users (such as the first and second users 102A and 102B). In one scenario, the merchant may offer various incentives (such as cashback, reward points, loyalty points, or the like) to the users when the users purchase or avail products and/or services from it.

The acquirer server 108 is a computing server that is associated with the acquirer bank. The acquirer bank processes the authorization and transaction requests, received from the merchant server 106 by using the acquirer server 108. The acquirer server 108 transmits the transaction requests to payment networks or issuer banks associated with user accounts from which the corresponding transactions are performed, via the communication network 116. The acquirer server 108 credits the merchant account in the acquirer bank with a transaction amount, when the corresponding transaction is settled.

The payment network server 110 is a computing server that is associated with a payment network of various transaction cards. The payment network server 110 represents an intermediate entity between the acquirer server 108 and the first and second issuer servers 112A and 112B for authorizing and funding the transactions performed using the transaction cards by the users. In one embodiment, the payment network server 110 hosts the mobile application and/or the website which enables the users (such as the first and second users 102A and 102B) to register their payment modes (such as transaction cards and/or e-wallets) for making purchases at various merchants. The mobile application and/or the website further offer the payment mode interchange service to the users who have registered their payment modes with the payment network server 110. In one exemplary scenario, a merchant may have provided an offer on a purchase that a user (for example, the first user 102A) is trying to make. The offer includes an incentive to be given to the first user 102A if she makes the purchase by using a payment mode having a specific brand, type, or category. However, the first payment mode of the first user 102A may not satisfy the specific brand, type, or category as specified in the offer. In such a scenario if the first user 102A has availed the payment mode interchange service of the payment network server 110, the payment network server 110 identifies payment modes of other users, which are relevant to the offer, from a pool of payment modes that are registered with the payment network server 110. The payment network server 110 communicates information associated with the identified payment modes to the first user 102A. If the first user 102A selects one of the identified payment modes to make the purchase, the payment network server 110 facilitates a transaction for the purchase such that the selected payment mode is charged with a purchase amount of the purchase and the first user 102A receives the incentive offered on the purchase. Further, the payment network server 110 ensures that a user (for example, the second user 102B), whose payment mode was selected by the first user 102A for making the purchase, receives an offer amount that she may have demanded in exchange for allowing the purchase to be made from her payment mode.

The payment network server 110 further communicates the credit and/or debit requests to the acquirer server 108, the first and second issuer servers 112A and 112B, and the first and second e-wallet servers 114A and 114B to indicate crediting and/or debiting of user accounts corresponding to transactions performed from the user accounts. Examples of various payment networks include MasterCard®, American Express®, VISA®, Discover®, Diners Club®, and the like.

Figure 3:
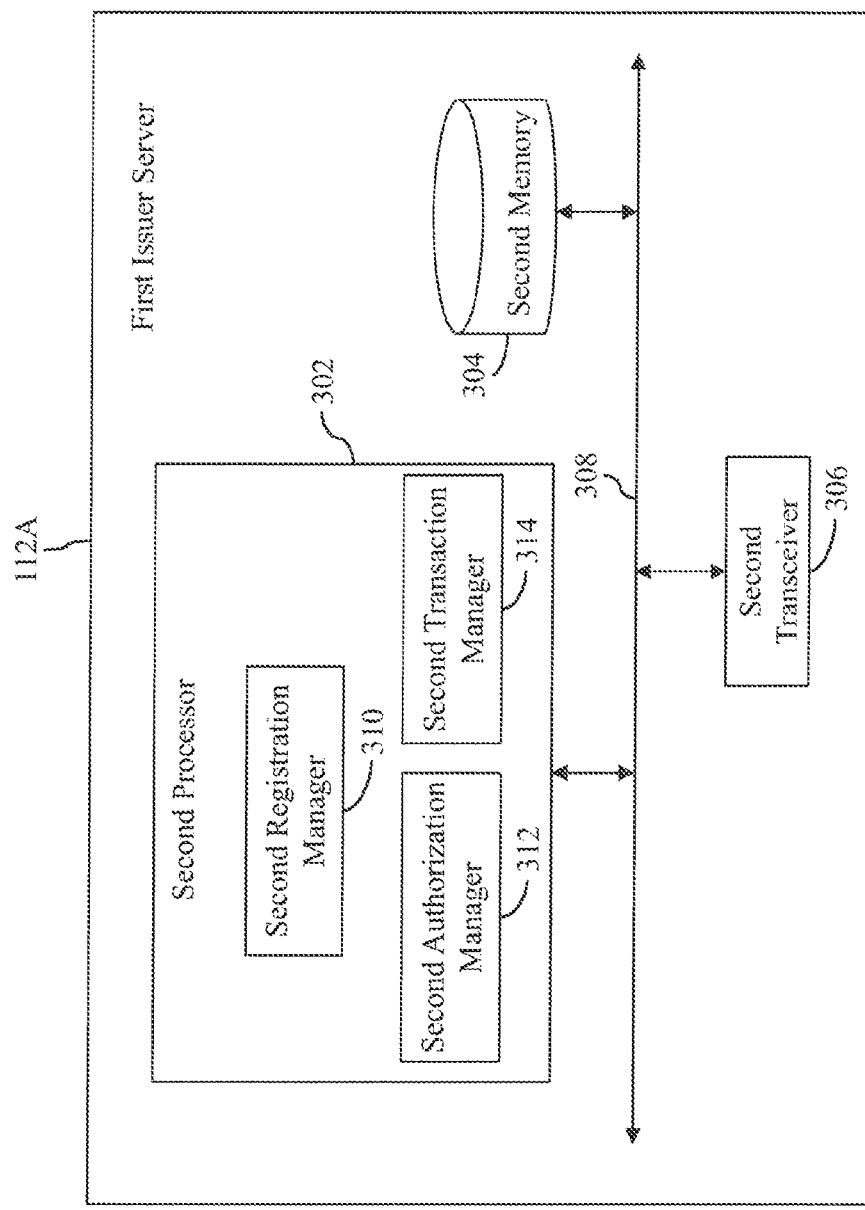
FIG. 3 is a block diagram that illustrates a first issuer server of the communication environment of FIG. 1, in accordance with another embodiment of the present invention.

The first issuer server 112A is a computing server that is associated with the first issuer bank. The first issuer bank is a financial institution that manages user accounts of multiple users. Account details of the user accounts established with the first issuer bank are stored as account profiles in a memory (as shown in FIG. 3) of the first issuer server 112A or on a cloud server associated with the first issuer server 112A. The account details may include an account balance, a credit line, details of an account holder, transaction history of the account holder, account identification information, details of a transaction card linked to the corresponding user account, or the like. The details of the account holder may include name, age, gender, physical attributes, registered contact number, alternate contact number, registered e-mail ID, or the like of the account holder. In one embodiment, the account details are stored in an encrypted format to ensure data security to the users. The first issuer server 112A receives various credit and debit requests from the payment network server 110. Based on the credit and debit requests, the first issuer server 112A credits and debits the corresponding user accounts. In another embodiment, the first issuer server 112A may host the mobile application and/or the website which enables the users to register their corresponding payment modes issued by the first issuer bank for making purchases at various merchants. The mobile application and/or the website further offer the payment mode interchange service (as described in the foregoing) to the users, who have registered their payment modes with the first issuer server 112A.

Similarly, the second issuer server 112B is a computing server that is associated with the second issuer bank. The second issuer server 112B receives various credit and debit requests from the payment network server 110. Based on the credit and debit requests, the second issuer server 112B credits and debits the corresponding user accounts maintained at the second issuer bank. It will be apparent to a person skilled in the art that the second issuer server 112B is functionally similar to the first issuer server 112A. Methods for crediting and debiting the user accounts via the first and second issuer servers 112A and 112B will be apparent to persons having skill in the art and may include processing via the traditional four-party system or the traditional three-party system.

The first e-wallet server 114A is a computing server that is associated with a first e-wallet service provider. The first e-wallet server 114A maintains e-wallet accounts of various users (such as the first user 102A). The first e-wallet server 114A may host an e-wallet application or an e-wallet website executable on user-devices (such as the first user-device 104A) for enabling the users to access their e-wallet accounts and e-wallets for making purchases. The first e-wallet server 114A further stores user profiles of the users, such that each-user profile is linked to the corresponding e-wallet account. Each user profile may store information of the corresponding user, such as a username and/or password of the user for the corresponding e-wallet account, details of transaction cards saved by the user for loading the corresponding e-wallet with the electronic cash. Such information may be stored in an encrypted format in an e-wallet database (not shown) of the first e-wallet server 114A or on a cloud server associated with the first e-wallet server 114A for ensuring data security. Similarly, the second e-wallet server 114B is a computing server that is associated with a second e-wallet service provider, who is different from the first e-wallet service provider. It will be apparent to a person skilled in the art that the second e-wallet server 114B is functionally similar to the first e-wallet server 114A.

Examples of the merchant server 106, the acquirer server 108, the payment network server 110, the issuer servers 112, and the first and second e-wallet servers 114A and 114B include, but are not limited to, computers, laptops, minicomputers, mainframe computers, any non-transient and tangible machines that can execute a machine-readable code, cloud-based servers, distributed server networks, or a network of computer systems.

The communication network 116 is a medium through which content and messages are transmitted between various entities, such as the first and second user-devices 104A and 104B, the merchant server 106, the acquirer server 108, the payment network server 110, the issuer servers 112, and the first and second e-wallet servers 114A and 114B. Examples of the communication network 116 include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the communication environment 100 may connect to the communication network 116 in accordance with various wired and wireless communication protocols, such as Transmission Control Protocol and Internet Protocol (TCP/IP), User Datagram Protocol (UDP), $2^{nd}$ Generation (2G), $3^{rd}$ Generation (3G), $4^{th}$ Generation (4G), $5^{th}$ Generation (5G) communication protocols, Long Term Evolution (LTE) communication protocols, or any combination thereof.

Figure 2:
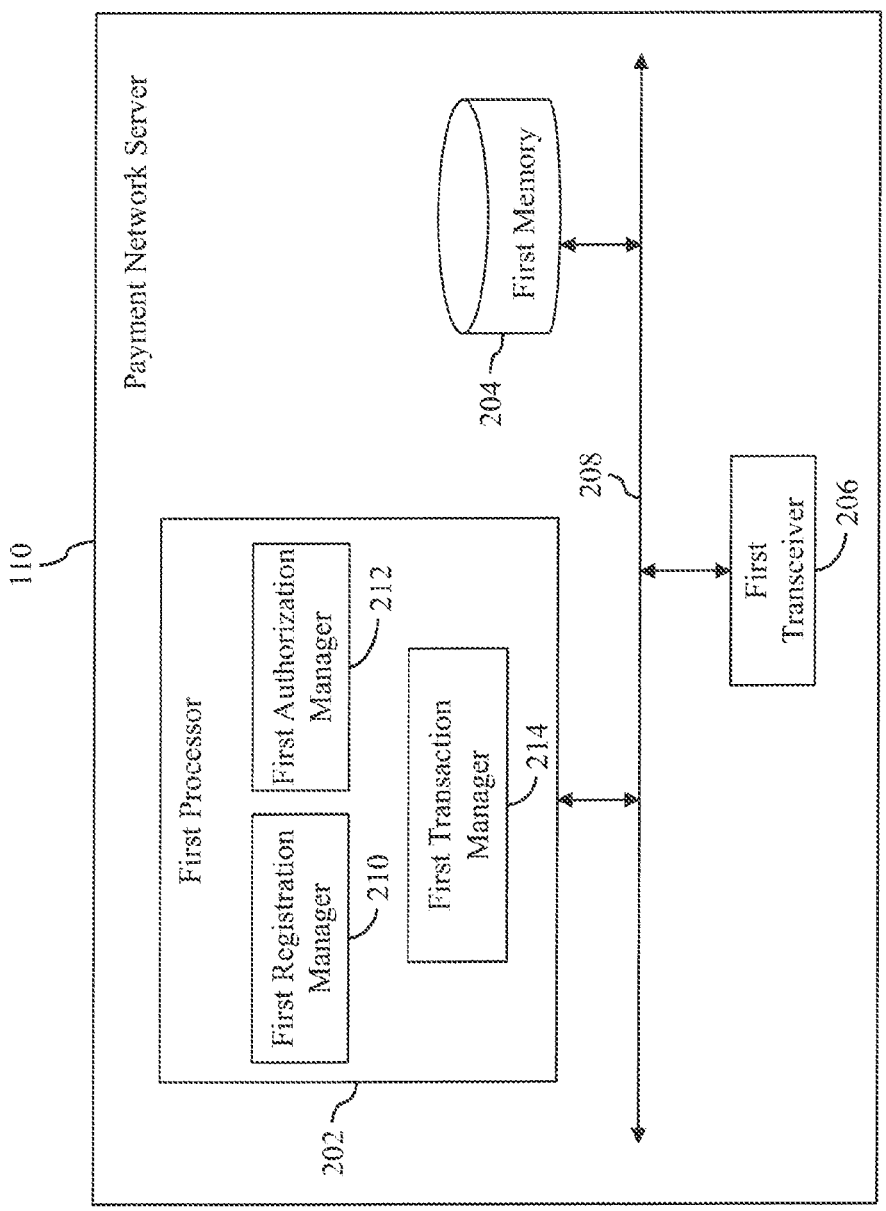
FIG. 2 is a block diagram that illustrates a payment network server of the communication environment of FIG. 1, in accordance with an embodiment of the present invention.

Functional elements of the payment network server 110 and the first issuer server 112A are explained in detail in conjunction with FIGS. 2 and 3, respectively.

FIG. 2 is a block diagram that illustrates the payment network server 110 of the communication environment 100 of FIG. 1, in accordance with an embodiment of the present invention. The payment network server 110 includes a first processor 202, a first memory 204, and a first transceiver 206 that communicate with each other via a first bus 208.

The first processor 202 includes suitable logic, circuitry, and/or interfaces to execute operations for facilitating electronic transactions performed by using various payment modes, such as transaction cards or e-wallets. In one embodiment, the first processor 202 hosts the mobile application or the website, which is executable on user-devices (such as the first and second user-devices 104A and 104B), for offering the payment mode interchange service to the users. The first processor 202 registers various payment modes of the users (such as the first and second users 102A and 102B) and facilitates transactions performed by the users (such as the first and second users 102A and 102B) by way of the registered payment modes for purchasing and/or availing products and/or services from various merchants. The first processor 202 includes a first registration manager 210, a first authorization manager 212, and a first transaction manager 214 for facilitating the transactions performed by the users and offering the payment mode interchange service to the users. Examples of the first processor 202 include, but are not limited to, an application-specific integrated circuit (ASIC) processor, a reduced instruction set computing (RISC) processor, a complex instruction set computing (CISC) processor, a field-programmable gate array (FPGA), and the like.

The first memory 204 includes suitable logic, circuitry, and/or interfaces to store information of partner issuer and acquirer banks and partner merchants. The first memory 204 further stores user profiles of the users, who have registered their payment modes with the payment network server 110. A user profile of a user includes information of the user and information pertaining to the payment mode registered by the user. Such information is stored in an encrypted format to ensure data security to the users. The first memory 204 further stores a set of codes, instructions, or the like, which enables the first processor 202 to host the mobile application or the website. Examples of the first memory 204 include a random-access memory (RAM), a read-only memory (ROM), a removable storage drive, a hard disk drive (HDD), a flash memory, a solid-state memory, and the like. It will be apparent to a person skilled in the art that the scope of the invention is not limited to realizing the first memory 204 in the payment network server 110, as described herein. In another embodiment, the first memory 204 may be realized in form of a database server or a cloud storage working in conjunction with the payment network server 110, without departing from the scope of the invention.

The first transceiver 206 includes suitable logic, circuitry, and/or interfaces that transmits and receives data over the communication network 116 using one or more communication network protocols under the control of the first processor 202. The first transceiver 206 transmits/receives various requests and messages to/from the first and second user-devices 104A and 104B, the merchant server 106, the acquirer server 108, the issuer servers 112, the first and second e-wallet servers 114A and 114B, or other entities that are pursuant to one or more standards for the interchange of transaction messages (such as the ISO8583 standard). Examples of the first transceiver 206 include, but are not limited to, an antenna, a radio frequency transceiver, a wireless transceiver, a Bluetooth transceiver, an ethernet port, a universal serial bus (USB) port, or any other device configured to transmit and receive data.

The first registration manager 210 includes suitable logic, circuitry, and/or interfaces for registering various payment modes (such as transaction cards and/or e-wallets) of the users. The first registration manager 210 declines the registration of a payment mode, when the payment mode is not verified by an entity (such as an issuer bank or an e-wallet service provider) that had issued the payment mode to the corresponding user. The first registration manager 210 creates and updates the user profiles of the users (such as the first user 102A and the second user 102B) who have registered their payment mode/s with the payment network server 110. The user profile of each user includes a list of registered payment mode/s and the corresponding details in encrypted format.

The first authorization manager 212 includes suitable logic, circuitry, and/or interfaces for authorizing transactions that are performed by the users (for example the first and second users 102A and 102B) through the mobile application or the website hosted by the payment network server 110. The first authorization manager 212 initiates an authorization request to be communicated to a user (such as the first or second user 102A or 102B), when the user attempts to perform a transaction by using the registered payment mode. The first authorization manager 212 does not authorize the transaction, when the corresponding user declines the transaction. The first authorization manager 212 authorizes the transaction, when the corresponding user approves the transaction.

The first transaction manager 214 includes suitable logic, circuitry, and/or interfaces for generating the credit or debit requests based on the corresponding transactions that are authorized. The first transaction manager 214 communicates the credit or debit requests to the acquirer and issuer servers 108 and 112 by way of the first transceiver 206. The first transaction manager 214 further initiates a blocking of a certain amount (as specified by the account holder) from a user account or the available credit line linked to the registered payment mode at the time of registration.

It will be apparent to a person skilled in the art that the third-party server that hosts the mobile application or the website for facilitating electronic transactions and offering the payment mode interchange service may also be implemented by the block diagram of FIG. 2, without deviating from the scope of the invention. The functions performed by the payment network server 110 are explained later in detail in conjunction with FIGS. 4A, 4B, 5A and 5B, 6A and 6B, and 7A and 7B.

FIG. 3 is a block diagram that illustrates the first issuer server 112A of the communication environment 100 of FIG. 1, in accordance with an embodiment of the present invention. The first issuer server 112A includes a second processor 302, a second memory 304, and a second transceiver 306 that communicate with each other via a second bus 308.

The second processor 302 includes suitable logic, circuitry, and/or interfaces to execute operations for facilitating electronic transactions performed by using various payment modes, such as transaction cards. In one embodiment, the second processor 302 hosts the mobile application or the website, which is executable on user-devices (such as the first and second user-devices 104A and 104B). The second processor 302 registers various transaction cards of the users (such as the first and second users 102A and 102B) that are issued by the first issuer bank and facilitates transactions performed by the users (such as the first and second users 102A and 102B) by way of the registered transaction cards for purchasing and/or availing products and/or services from various merchants. The second processor 302 includes a second registration manager 310, a second authorization manager 312, and a second transaction manager 314 to implement the functionality for facilitating the transactions performed by the users. Examples of the second processor 302 include, but are not limited to, an ASIC processor, a RISC processor, a CISC processor, an FPGA, and the like.

The second memory 304 includes suitable logic, circuitry, and/or interfaces to store account profiles for the user accounts that are maintained at the first issuer bank. The second memory 304 further stores the user profiles of the users, who have registered their transaction cards with the first issuer server 112A. The second memory 304 further stores a set of codes, instructions, or the like, which enables the second processor 302 to host the mobile application or the web site. Examples of the second memory 304 include a RAM, a ROM, a removable storage drive, an HDD, a flash memory, a solid-state memory, and the like. It will be apparent to a person skilled in the art that the scope of the invention is not limited to realizing the second memory 304 in the first issuer server 112A, as described herein. In another embodiment, the second memory 304 may be realized in form of a database server or a cloud storage working in conjunction with the first issuer server 112A, without departing from the scope of the invention.

The second transceiver 306 transmits and receives data over the communication network 116 using one or more communication network protocols. The second transceiver 306 transmits/receives various requests and messages to/from the first and second user-devices 104A and 104B, the merchant server 106, the acquirer server 108, the payment network server 110, or other entities that are pursuant to one or more standards for the interchange of transaction messages (such as the ISO8583 standard). Examples of the second transceiver 306 include, but are not limited to, an antenna, a radio frequency transceiver, a wireless transceiver, a Bluetooth transceiver, an ethernet port, a USB port, or any other device configured to transmit and receive data.

The second registration manager 310 includes suitable logic, circuitry, and/or interfaces for registering various transaction cards of the users. The second registration manager 310 declines the registration of a transaction card, when the transaction card is not verified. The second registration manager 310 creates and updates the user profiles of the users who have registered their transaction card/s with the first issuer server 112A. The user profile of each user includes a list of registered payment mode/s and the corresponding details in an encrypted format.

The second authorization manager 312 includes suitable logic, circuitry, and/or interfaces for authorizing transactions that are performed by the users, through the mobile application or the web site hosted by the first issuer server 112A, for purchasing and/or availing products and/or services from the merchant. The second authorization manager 312 initiates an authorization request to be communicated to a user (such as the first user 102A), when the user attempts to perform a transaction by using the registered transaction card. The second authorization manager 312 does not authorize the transaction, when the corresponding user declines the transaction. The second authorization manager 312 authorizes the transaction, when the corresponding user approves the transaction.

The second transaction manager 314 includes suitable logic, circuitry, and/or interfaces for crediting or debiting user accounts based on the corresponding transactions that are authorized. The second transaction manager 314 further blocks certain amount (as specified by the account holder) from a user account or the available credit line linked to the registered transaction card at the time of registration.

It will be apparent to a person skilled in the art that the second issuer server 112B may also be implemented by the block diagram of FIG. 3, without deviating from the scope of the invention. The functions performed by the first issuer server 112A are explained later in detail in conjunction with FIGS. 8 and 9A and 9B.

Figure 4A:
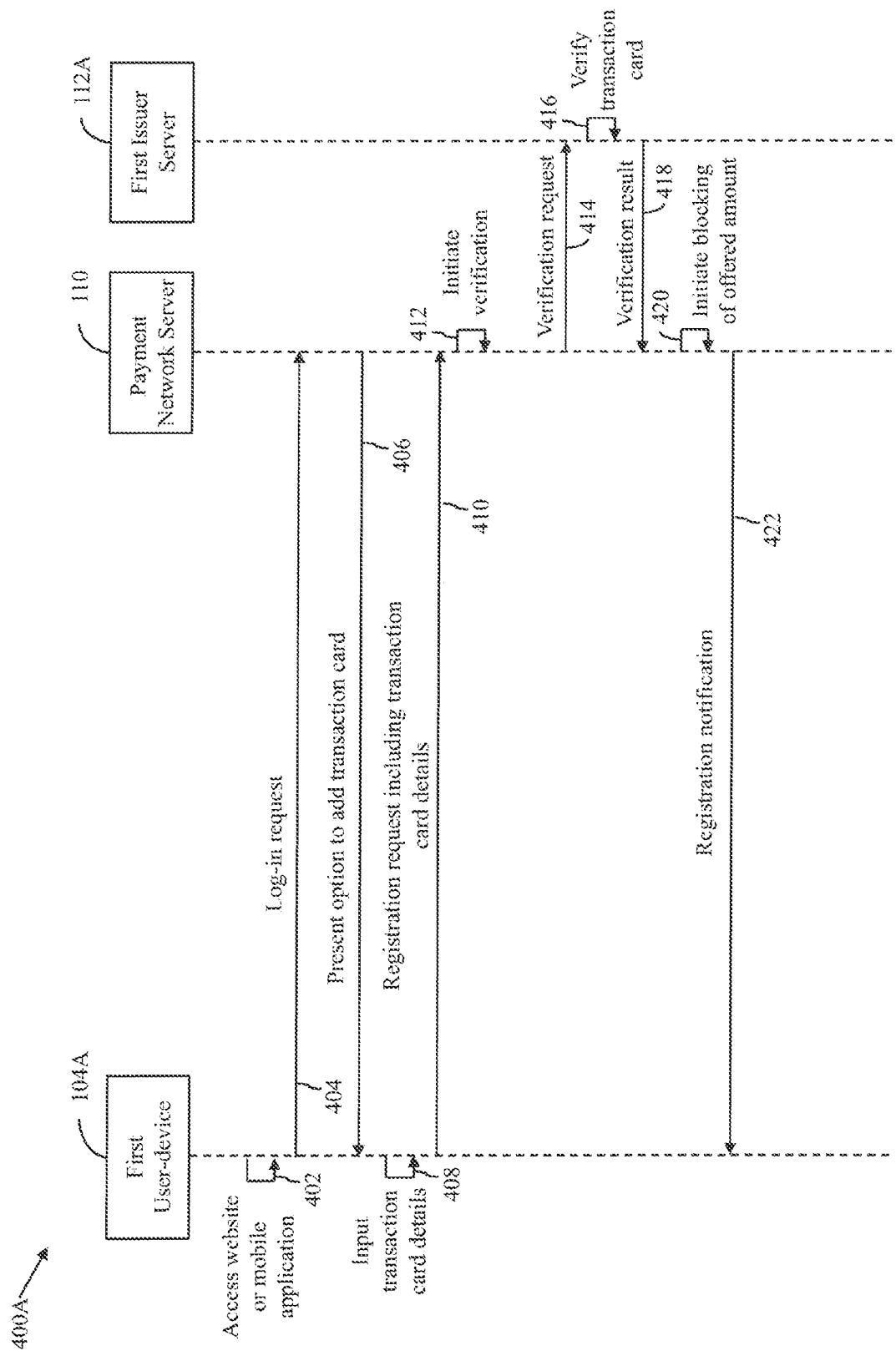
FIG. 4A is a process flow diagram that illustrates registration of a first payment mode for availing a payment mode interchange service offered by the payment network server of the communication environment of FIG. 1, in accordance with an embodiment of the present invention.

FIG. 4A is a process flow diagram 400A that illustrates registration of the first payment mode of the first user 102A for availing the payment mode interchange service offered by the payment network server 110, in accordance with an embodiment of the present invention. The payment network server 110 hosts the mobile application or the website that offers the payment mode interchange service to various users, such as the first user 102A. The payment mode interchange service enables the users to make purchases at various merchants, who have partnered with the payment network server 110. For the sake of ongoing discussion, it is assumed that the first payment mode is the first transaction card.

The first user 102A uses the first user-device 104A to access the mobile application or the website hosted by the payment network server 110 for registering the first transaction card (as shown by arrow 402). For the sake of simplicity, it is assumed that the first user 102A accesses the mobile application that is installed on the memory of the first user-device 104A. In one embodiment, the first user 102A registers with the payment network server 110 for accessing the mobile application by providing her user details, such as a login ID, a login password, a contact number, an e-mail ID, name, age, and the like. In one embodiment, the first user 102A is already registered with the payment network server 110 for accessing the mobile application. The first user 102A opens the mobile application on the first user-device 104A and the mobile application prompts the first user 102A to submit the corresponding login details, such as the login ID and the login password. The first user 102A submits the login details on the mobile application and a log-in request is thus initiated.

The first transceiver 206 receives the log-in request from the first user-device 104A (as shown by arrow 404). The first registration manager 210 retrieves the login details from the log-in request and fetches a user profile of the first user 102A from the first memory 204, based on the login ID. The first registration manager 210 further compares the login password submitted by the first user 102A with the login password stored in the user profile of the first user 102A. In one scenario, when the login password submitted by the first user 102A matches the login password stored in the user profile, the first registration manager 210 grants the first user 102A an access to the mobile application and the login is successful. In an alternate scenario, when the login password does not match the login password stored in the user profile, the first user 102A is denied access to the mobile application and the login fails.

When the first user 102A is granted access to the mobile application, the first registration manager 210 presents an option to the first user 102A through a graphical user interface (GUI) of the mobile application to add a transaction card for registration (as shown by arrow 406). The GUI is displayed on a display (not shown) of the first user-device 104A. The first user 102A selects the option presented on the GUI to add the first transaction card. When the first user 102A selects the option, the first registration manager 210 prompts the first user 102A to submit details of the transaction card which the first user 102A wants to register and an amount (hereinafter referred to as "first block amount") that the first user 102A wants to block from a user account or available credit line linked to the transaction card. The first user 102A thus submits the details of the first transaction card and the first block amount (for example, $1,000) (as shown by arrow 408). The details of the first transaction card include the unique card number, the card security code, and the expiry date of the first transaction card. The details of the first transaction card and the first block amount as submitted by the first user 102A are communicated to the payment network server 110 by way of a registration request (as shown by arrow 410).

The first transceiver 206 receives the details of the first transaction card and the first block amount from the first user-device 104A. The first authorization manager 212 initiates a verification of the first transaction card based on the details of the first transaction card (as shown by arrow 412). The first authorization manager 212, in conjunction with the first transceiver 206, transmits a verification request to an issuer (i.e., the first issuer server 112A of the first issuer bank) of the first transaction card for verifying the first transaction card (as shown by arrow 414). The verification request includes the details of the first transaction card.

The first issuer server 112A that corresponds to the first issuer bank receives the verification request from the payment network server 110 over the communication network 116. Based on the verification request, the first issuer server 112A verifies the first transaction card (as shown by arrow 416). To verify the first transaction card, the first issuer server 112A compares the details of the first transaction card against the transaction card details of multiple users stored in the second memory 304. If the first issuer server 112A finds a match for the first transaction card, the first issuer server 112A determines that the first transaction card is verified, else, the first issuer server 112A determines that the first transaction card is not verified.

The first issuer server 112A then communicates a result of the verification to the payment network server 110 (as shown by arrow 418). In one embodiment, the mobile application may prompt the first user 102A to re-submit the details of the first transaction card, when the result of the verification indicates that the first transaction card is not verified. In another embodiment, when the result of the verification indicates that the first transaction card is verified, the first registration manager 210 registers the first transaction card and initiates a blocking of the first block amount from the first user account or the available credit line linked to the first transaction card (as shown by arrow 420).

For blocking the first block amount from the first user account or the available credit line, the first registration manager 210 communicates a block request to the first issuer server 112A. The block request includes the first block amount and the details of the first transaction card. Based on the block request, the first issuer server 112A checks whether the first user account has sufficient funds to cover the first block amount. The funds may correspond to an account balance of the first user account linked to the first transaction card or an available credit line of the first user account. In one scenario where the first issuer server 112A determines that the first user account has sufficient funds to cover the first block amount, the first issuer server 112A prompts the first user 102A to authorize the blocking of the first block amount from the first user account. The first issuer server 112A may prompt the first user 102A by way of a message on the contact number of the first user 102A, an e-mail on the e-mail ID of the first user 102A, a call on the contact number of the first user 102A, a push notification on the contact number of the first user 102A, or any other means known to a person having ordinary skill in the art. Based on an approval from the first user 102A, the first issuer server 112A blocks the first block amount from the first user account or the available credit line. Once the first block amount is blocked, the first transaction card is registered with the payment network server 110 and the payment network server 110 only requires an approval from the first user 102A to actually deduct the first block amount in entirety or in parts from the first user account or the available credit line. The first registration manager 210 updates the user profile of the first user 102A stored in the first memory 204 to include the details of the first transaction card that is registered. In an alternate scenario where the first issuer server 112A determines that the first user account does not have sufficient funds to cover the first block amount, the first issuer server 112A notifies the payment network server 110. The first registration manager 210 then prompts the first user 102A to re-submit a lower value of the first block amount such that the funds in the first user account covers the re-submitted first block amount.

Once the first block amount is successfully blocked from the first user account or the available credit line of the first transaction card, the first registration manager 210 communicates a registration notification to the first user 102A through the mobile application to indicate that the first transaction card is successfully registered with the payment network server 110 (as shown by arrow 422). The first transaction card is then added to a list of registered payment modes of the first user 102A, and thus can be used to avail the payment mode interchange service while making purchases at various merchants that have partnered with the payment network server 110.

The first user 102A further submits a first payment option based on which the payment network server 110 is allowed to use the first transaction card for initiating a transaction for a purchase made by another user. The first payment option indicates a first offer amount that is demanded by the first user 102A in exchange for paying a purchase amount for the other user through the first transaction card. In one example, the first payment option indicates "$1,200 in exchange for paying $1,000 through the first transaction card", i.e., the first user 102A allows the payment network server 110 to charge $1,000 on the first transaction card for the purchase that the other user intends to make in exchange for $1,200. In this scenario, "$1,200" corresponds to the first offer amount. In another example, the first payment option indicates "1.15× in exchange for 1×", i.e., the first user 102A allows the payment network server 110 to charge the first transaction card with the purchase amount for the purchase that the other user intends to make in exchange for an amount that is 1.15 times the purchase amount. In this scenario, "1.15×" corresponds to the first offer amount. The first registration manager 210 links the registered first transaction card to the first payment option submitted by the first user 102A.

In one embodiment, the first registration manager 210 allocates a first digital currency amount equivalent to the first block amount and updates the user profile of the first user 102A stored in the first memory 204 to include the first digital currency amount. For example, when 1 DC=$2 (where DC is the digital currency unit), the first registration manager 210 allocates 500 DC to the first user 102A that is equivalent to $1,000 (i.e., the first block amount).

It will be apparent to a person having ordinary skill in the art that other users including the second user 102B may also register their transaction cards with the payment network server 110 for availing the payment mode interchange service by transmitting various registration requests. Thus, the payment network server 110 maintains a pool of registered transaction cards and the corresponding payment options.

Figure 4B:
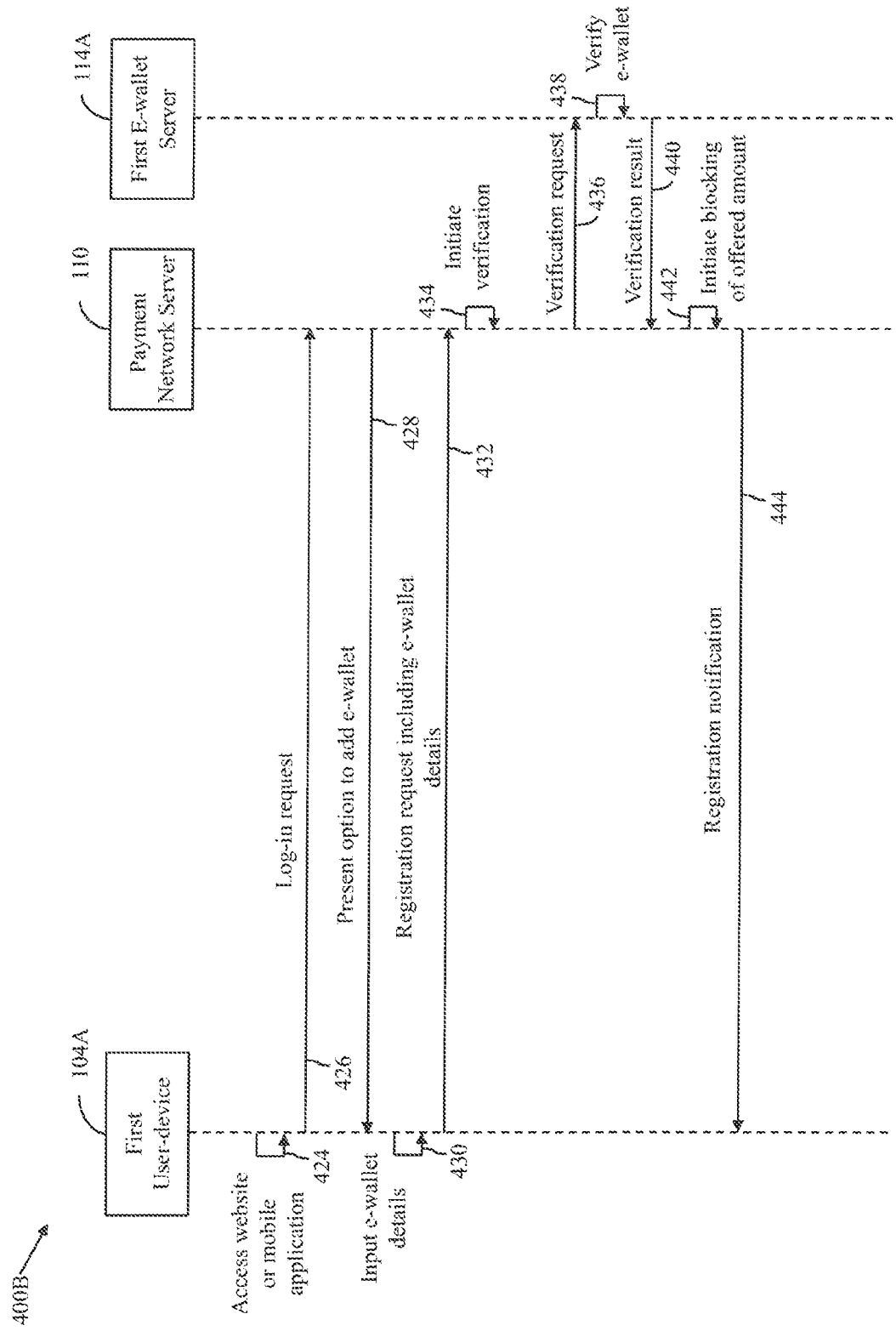
FIG. 4B is a process flow diagram that illustrates registration of a first payment mode for availing a payment mode interchange service offered by the payment network server of the communication environment of FIG. 1, in accordance with an embodiment of the present invention.

FIG. 4B is a process flow diagram 400B that illustrates registration of the first payment mode of the first user 102A for availing the payment mode interchange service offered by the payment network server 110, in accordance with an embodiment of the present invention. The payment network server 110 hosts the mobile application or the website that offers the payment mode interchange service to various users, such as the first user 102A. The payment mode interchange service enables the users to make purchases at various merchants, who have partnered with the payment network server 110. For the sake of ongoing discussion, it is assumed that the first payment mode is the first e-wallet.

The first user 102A uses the first user-device 104A to access the mobile application or the website hosted by the payment network server 110 for registering the first e-wallet (as shown by arrow 424). For the sake of simplicity, it is assumed that the first user 102A accesses the website by using the browser that is installed on the memory of the first user-device 104A. In one embodiment, the first user 102A registers with the payment network server 110 for accessing the website. In one embodiment, the first user 102A is already registered with the payment network server 110 for accessing the website. The first user 102A opens the website on the first user-device 104A and the website prompts the first user 102A to submit the corresponding login details, such as the login ID and the login password. The first user 102A submits the login details on the website and a log-in request is thus initiated.

The first transceiver 206 receives the log-in request from the first user-device 104A (as shown by arrow 426). The first registration manager 210 retrieves the login details from the log-in request and fetches a user profile of the first user 102A from the first memory 204, based on the login ID. The first registration manager 210 further compares the login password submitted by the first user 102A with the login password stored in the user profile of the first user 102A. In one scenario, when the login password submitted by the first user 102A matches the login password stored in the user profile, the first registration manager 210 grants the first user 102A an access to the website and the login is successful. In an alternate scenario, when the login password does not match the login password stored in the user profile, the first user 102A is denied access to the website and the login fails.

When the first user 102A is granted access to the website, the first registration manager 210 presents an option to the first user 102A through a graphical user interface (GUI) of the website to add an e-wallet for registration (as shown by arrow 428). The GUI is displayed on the display of the first user-device 104A. The first user 102A selects the option presented on the GUI to add the first e-wallet. When the first user 102A selects the option, the first registration manager 210 prompts the first user 102A to submit details of the e-wallet which the first user 102A wants to register and the first block amount that the first user 102A wants to block from the e-wallet. The first user 102A thus submits the details of the first e-wallet and the first block amount (for example $1,000) (as shown by arrow 430). The details of the first e-wallet include the username, the contact number, and the e-mail ID of the first user 102A. The details of the first e-wallet and the first block amount as submitted by the first user 102A are communicated to the payment network server 110 by way of the registration request (as shown by arrow 432). The first transceiver 206 receives the details of the first e-wallet and the first block amount from the first user-device 104A. The first authorization manager 212 initiates a verification of the first e-wallet based on the details of the first e-wallet (as shown by arrow 434).

In one embodiment, the first authorization manager 212, in conjunction with the first transceiver 206, transmits a verification request to the first e-wallet service provider (i.e., the first e-wallet server 114A) that maintains the first e-wallet for verifying the first e-wallet (as shown by arrow 436). The verification request includes the details of the first e-wallet. The first e-wallet server 114A that corresponds to the first e-wallet service provider receives the verification request from the payment network server 110 over the communication network 116. Based on the verification request, the first e-wallet server 114A verifies the first e-wallet (as shown by arrow 438). To verify the first e-wallet, the first e-wallet server 114A compares the details of the first e-wallet against the e-wallet details of multiple users stored in its memory (not shown). If the first e-wallet server 114A finds a match for the first e-wallet, the first e-wallet server 114A determines that the first e-wallet is verified, else, the first e-wallet server 114A determines that the first e-wallet is not verified. The first issuer server 112A then communicates a result of the verification to the payment network server 110 (as shown by arrow 440). In another embodiment, the first authorization manager 212 initiates a transaction of a pre-defined amount from the first e-wallet for verifying the first e-wallet. The first authorization manager 212 uses the details of the first e-wallet to initiate the transaction. The first e-wallet server 114A seeks an approval from the first user 102A for the transaction. Once the first user 102A approves the transaction, the first e-wallet server 114A completes the transaction and notifies the payment network server 110 that the transaction of the pre-defined amount is successful and the pre-defined amount is transferred to the payment network server 110.

In one embodiment, the website may prompt the first user 102A to re-submit the details of the first transaction card, when the result of the verification indicates that the first transaction card is not verified or when the transaction of the pre-defined amount is unsuccessful. In another embodiment where the result of the verification indicates that the first transaction card is verified or when the transaction of the pre-defined amount is successful, the first registration manager 210 registers the first e-wallet and initiates a blocking of the first block amount from the first e-wallet (as shown by arrow 442).

For blocking the first block amount from the first e-wallet, the first registration manager 210 communicates the block request to the first e-wallet server 114A. The block request includes the first block amount and the details of the first e-wallet. Based on the block request, the first e-wallet server 114A checks whether the first e-wallet has sufficient funds to cover the first block amount. In one scenario where the first e-wallet server 114A determines that the first e-wallet has sufficient funds to cover the first block amount, the first e-wallet server 114A prompts the first user 102A to authorize the blocking of the first block amount from the first e-wallet. The first e-wallet server 114A may prompt the first user 102A by way of a message on the contact number of the first user 102A, an e-mail on the e-mail ID of the first user 102A, a call on the contact number of the first user 102A, a push notification on the contact number of the first user 102A, or any other means known to a person having ordinary skill in the art. Based on an approval from the first user 102A, the first e-wallet server 114A blocks the first block amount from the first e-wallet. Once the first block amount is blocked, the first e-wallet is registered with the payment network server 110 and the payment network server 110 only requires an approval from the first user 102A to actually deduct the first block amount in entirety or in parts from the first e-wallet. The first registration manager 210 updates the user profile of the first user 102A stored in the first memory 204 to include the details of the first e-wallet that is registered. In an alternate scenario where the first e-wallet server 114A determines that the first e-wallet does not have sufficient funds to cover the first block amount, the first e-wallet server 114A notifies the payment network server 110. The first registration manager 210 then prompts the first user 102A to re-submit a lower value of the first block amount such that the funds in the first e-wallet covers the re-submitted first block amount.

Once the first block amount is successfully blocked from the first e-wallet, the first registration manager 210 communicates the registration notification to the first user 102A through the mobile application to indicate that the first e-wallet is successfully registered with the payment network server 110 (as shown by arrow 444). The first e-wallet is then added to the list of registered payment modes of the first user 102A and thus can be used to avail the payment mode interchange service while making purchases at various merchants that have partnered with the payment network server 110.

The first user 102A further submits the first payment option based on which the payment network server 110 is allowed to use the first e-wallet for initiating a transaction for a purchase made by another user as explained in the foregoing in FIG. 4A.

It will be apparent to a person having ordinary skill in the art that other users including the second user 102B may also register their e-wallets with the payment network server 110 for availing the payment mode interchange service. Thus, the payment network server 110 maintains a pool of registered e-wallets and registered transactions cards (hereinafter collectively referred to as "pool of payment modes"). Further, all the users can register as many payment modes as they want without deviating from the scope of the invention.

Figure 5A:
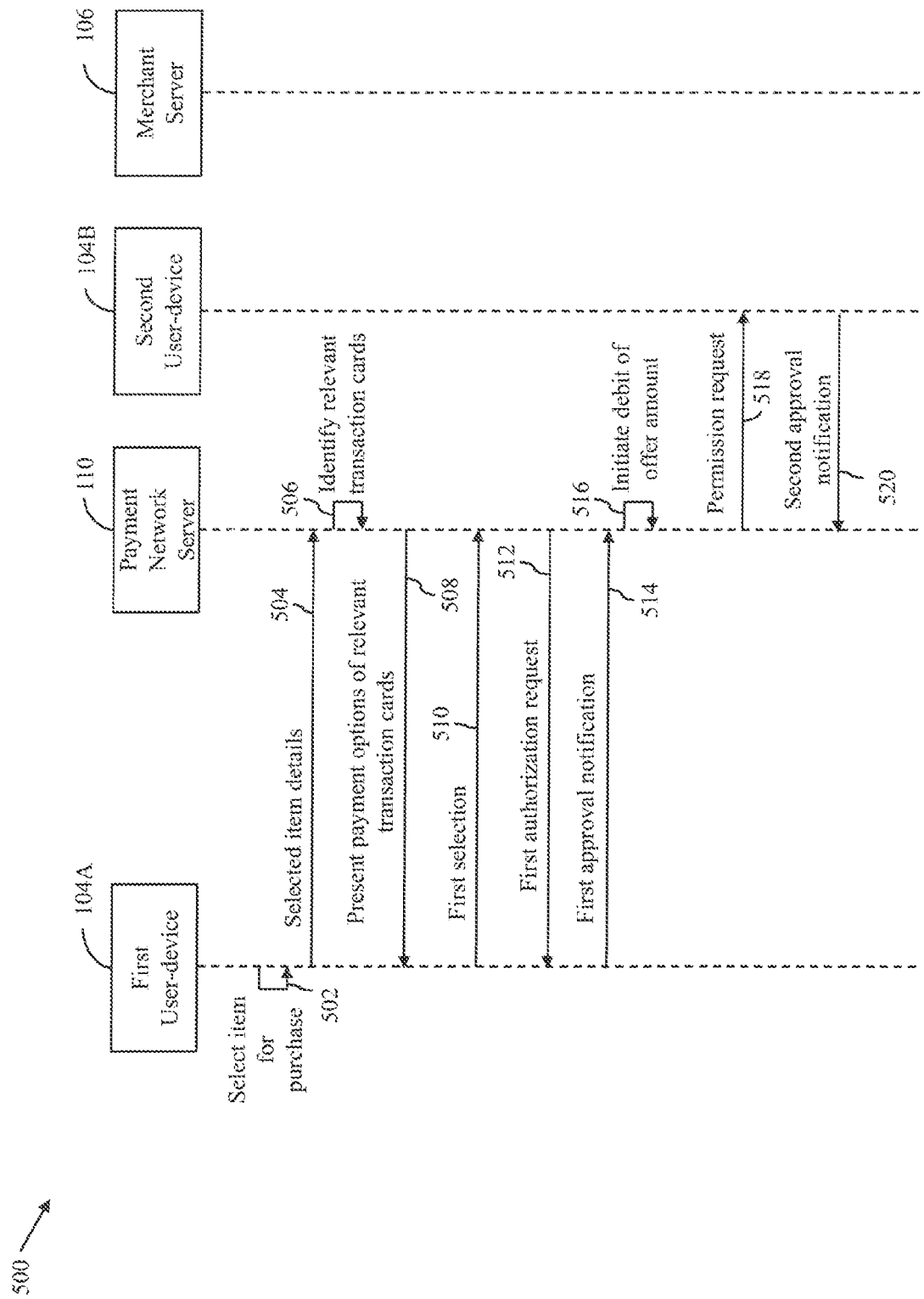
FIGS. 5A and 5B, collectively, represent a process flow diagram that illustrates an exemplary scenario for processing transactions, in accordance with an embodiment of the present invention.
Figure 5B:
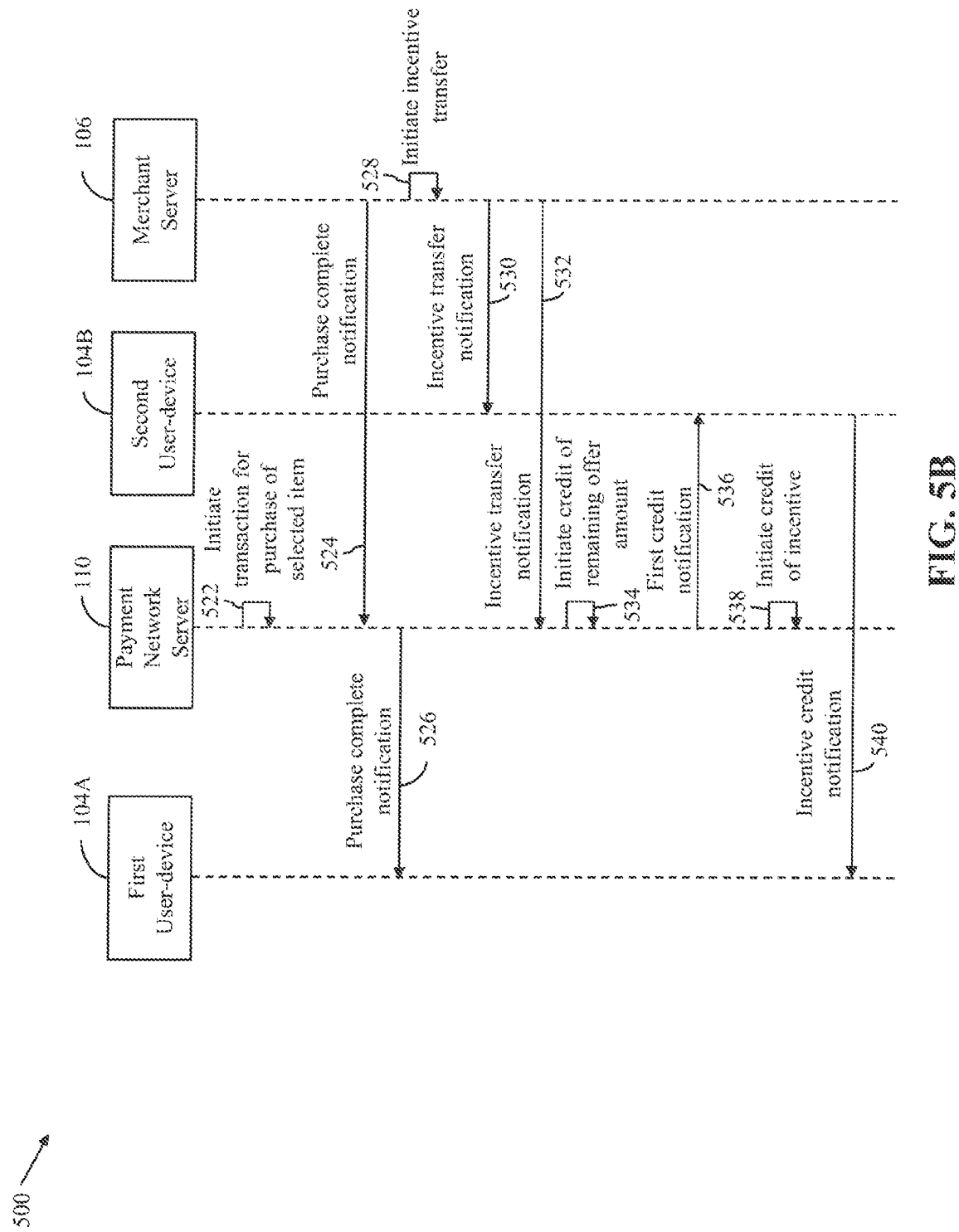

FIGS. 5A and 5B, collectively, represent a process flow diagram 500 that illustrates an exemplary scenario for processing transactions, in accordance with an embodiment of the present invention.

The process flow diagram 500 illustrates the first and second user-devices 104A and 104B, the merchant server 106, and the payment network server 110. The first user 102A logs in to the mobile application of the payment network server 110 in a similar manner as described in FIG. 4A. The first user 102A has already registered the first transaction card for availing the payment mode interchange service as described in FIG. 4A. When the first user 102A has successfully logged into the mobile application, the first user 102A browses through a catalogue of items listed for sale on the GUI of the mobile application. The first user 102A selects an item that she intends to purchase from the catalogue of items (as shown by arrow 502). The mobile application transmits details of the selected item (hereinafter referred to as "selected item details") to the payment network server 110 (as shown by arrow 504). The selected item details include a type of the selected item, a purchase amount of the selected item, and an offer offered by the merchant on the sale of the selected item. In one example, the purchase amount of the selected item is $100 and the offer is a cashback of $25 if the selected item is purchased by using a "Type-1" transaction card.

The first transceiver 206 receives the selected item details. In one embodiment, the first transaction manager 214 checks whether the offer on the sale of the selected item is applicable on the registered first transaction card of the first user 102A. In one scenario, the registered first transaction card is a "Type-1" transaction card. In such a scenario, the first transaction manager 214 determines that the offer is applicable on the first transaction card, and thus prompts the first user 102A to perform a transaction by way of the first transaction card for the purchase of the selected item. When the first user 102A performs the transaction, the first transaction manager 214 initiates the transaction and charges the first transaction card with the purchase amount (i.e., $100) of the selected item. The first block amount (i.e., $1,000) is then reduced by the purchase amount (i.e., $100) of the selected item. When the purchase of the selected item is complete, the merchant transfers the incentive (i.e., $25 cashback) to the first user account linked to the first transaction card.

However, in an alternate scenario, the registered first transaction card is a "Type-2" transaction card. Thus, the first transaction manager 214 determines that the offer is not applicable on the first transaction card. In such a scenario, the first transaction manager 214 identifies relevant transaction cards from the pool of registered transaction cards on which the offer is applicable (as shown by arrow 506). For example, the first transaction manager 214 identifies second through fourth transaction cards (i.e., "Type-1" transaction cards) of the second user 102B, third user (not shown) and fourth user (not shown), respectively, on which the offer is applicable. The first transaction manager 214 then retrieves second through fourth payment options as submitted by the second user 102B, and the third and fourth users during the registration of the second through fourth transaction cards, respectively, from the first memory 204. The second payment option indicates "$110 in exchange for paying $100 from the second transaction card", the third payment option indicates "$115 in exchange for paying $100 from the third transaction card", and the fourth payment option indicates "$120 in exchange for paying $100 from the fourth transaction card". $110, $115, and $120 are second through fourth offer amounts of the second user 102B and the third and fourth users with respect to the second through fourth transaction cards, respectively.

The first transaction manager 214 then presents the second through fourth payment options to the first user 102A through the GUI of the mobile application rendered on the first user-device 104A (as shown by arrow 508). In one embodiment, the first transaction manager 214 presents the best payment option at the top followed by other payment options. For example, since the second offer amount demanded by the second user 102B is least as compared to the third and fourth offer amounts, the first transaction manager 214 presents the second payment option at the top. The presented payment options are selectable by the first user 102A.

The first user 102A then compares the second through fourth payment options and selects one of the second through fourth payment options. It will be apparent to one skilled in the art the first user 102A may select any one of the presented payment options or may not select any of the presented payment options. For example, when the second through fourth payment options are less lucrative than the first transaction card of the first user 102A, the first user 102A may not select any of the presented payment options to make the purchase of the selected item. For the sake of ongoing discussion, it is assumed that the first user 102A selects the second payment option.

The mobile application installed in the first user-device 104A then communicates the selection (i.e., a first selection) of the second payment option to the payment network server 110 (as shown by arrow 510). The first transceiver 206 receives the first selection. Based on the first selection, the first authorization manager 212 communicates a first authorization request to the first user 102A for deducting the second offer amount (i.e., $110), demanded by the second user 102B in the second payment option, from the first block amount (as shown by arrow 512). The first authorization manager 212 communicates the first authorization request through the first user-device 104A by way of a message on the contact number of the first user 102A, an e-mail on the e-mail ID of the first user 102A, a call on the contact number of the first user 102A, a push notification, or any other means known to a person having ordinary skill in the art. The first user 102A approves the deduction of the second offer amount by communicating a first approval notification (as shown by arrow 514). In another embodiment, the first user 102A may not approve the deduction of the second offer amount, in such a scenario, the first transaction manager 214 prompts the first user 102A to re-select one of the payment option or the registered first transaction card for making the purchase of the selected item.

Based on the first approval notification received from the first user-device 104A, the first transaction manager 214 initiates a debit of the second offer amount (i.e., $110) from the first block amount (i.e., $1,000) (as shown by arrow 516). Once the second offer amount (i.e., $110) is debited from the first block amount, the remaining first block amount is $890 and the remaining first digital currency amount is 445 DC. In other words, the first transaction manager 214 charges the first transaction card of the first user 102A with the second offer amount (i.e., $110) indicated by the second payment option that is selected by the first user 102A.

The first authorization manager 212 further transmits a first permission request to the second user-device 104B of the second user 102B for seeking a permission from the second user 102B to use the second transaction card for the purchase of the selected item (as shown by arrow 518). The first permission request indicates the purchase amount of the selected item to the second user 102B. The first authorization manager 212 communicates the first permission request by way of a message on the contact number of the second user 102B, an e-mail on the e-mail ID of the second user 102B, a call on the contact number of the second user 102B, a push notification, or any other means known to a person having ordinary skill in the art. The second user 102B approves the use of the second transaction card for the purchase of the selected item by communicating a second approval notification (as shown by arrow 520). In another embodiment, the second user 102B may not approve the use of the second transaction card for the purchase of the selected item, in such a scenario, the first transaction manager 214 rolls back the second offer amount to the first user account and prompts the first user 102A to re-select one of the payment option or the registered first transaction card for making the purchase of the selected item.

Based on the second approval notification, the first transaction manager 214 initiates a transaction for the purchase of the selected item by way of the second transaction card (as shown by arrow 522). In other words, the first transaction manager 214 bills the purchase amount (i.e., $100) of the selected item on the second transaction card. In one embodiment, the purchase amount is deducted from a second block amount of the second user 102B. The acquirer server 108 credits the merchant account in the acquirer bank with the purchase amount. When the purchase of the selected item is complete and the merchant receives the purchase amount in the merchant account, the merchant server 106 transmits a purchase complete notification to the payment network server 110 (as shown by arrow 524). The first transceiver 206 communicates the purchase complete notification to the first user-device 104A to inform the first user 102A that the purchase of the selected item is successfully completed (as shown by arrow 526). On the completion of the purchase, the merchant server 106 initiates a transfer of the incentive (i.e., $25) to the second user 102B as the second transaction card was used for making the purchase of the selected item from the merchant (as shown by arrow 528). The merchant server 106 transmits an incentive transfer notification to the second user-device 104B and the payment network server 110 (as shown by arrows 530 and 532) to indicate that the incentive is successfully transferred to the second user 102B. The payment network server 110 ensures that the first user 102A receives the incentive transferred by the merchant server 106 and the second user 102B receives the second offer amount as indicated by the second payment option. For providing the second offer amount to the second user 102B, the first transaction manager 214 determines what part of the second offer amount (hereinafter referred to as "remaining second offer amount") is pending to be received by the second user 102B. The first transaction manager 214 determines the remaining second offer amount based on a difference of the second offer amount and the incentive that is already transferred by the merchant server 106 to the second user 102B. In this scenario, the remaining second offer amount is $110-$25=$85. The first transaction manager 214 initiates a credit of the remaining second offer amount to the second user account (as shown by arrow 534). When the remaining second offer amount is credited to the second user account of the second user 102B, the first transaction manager 214, in conjunction with the first transceiver 206, communicates a first credit notification to the second user-device 104B to indicate that the second offer amount is successfully credited to the second user account (as shown by arrow 536). For providing the incentive to the first user 102A, the first transaction manager 214 initiates a credit of the incentive (i.e., $25) in the first user account of the first user 102A (as shown by arrow 538). When the incentive is credited to the first user account of the first user 102A, the first transaction manager 214, in conjunction with the first transceiver 206, transmits a second credit notification to the first user-device 104A to indicate that the incentive provided by the merchant is successfully credited to the first user account (as shown by arrow 540). After the credit of the incentive (i.e., $25), the first block amount, which was $890 previously, is incremented by $25. The first transaction manager 214 further increments the remaining first digital currency amount (i.e., 445 DC) with a digital currency amount (i.e., 12.5 DC) equivalent to the incentive (i.e., $25). Thus, the incremented first digital currency amount is 457.5 DC. Hence, by availing the payment mode interchange service, the first user 102A pays $85 (i.e., $110-$25) instead of $100 for the purchase of the selected item and the second user 102B earns a profit of $10 (i.e., $25+$85-$100).

In another embodiment, the first user 102A may transmit a request to the payment network server 110 to present various payment options. The request includes a user-defined criterion, such as a specific category, brand, or type of the transaction card. In such a scenario, the first transaction manager 214 identifies the relevant transaction cards based on the user-defined criterion in the request. In one embodiment, the first user 102A may select multiple payment options from the presented payment options to pay the purchase amount in parts from payment modes associated with the selected payment options. For example, the offer may be a cashback of $25 on a purchase of $100 by using a "Type-1" transaction card. Thus, for a purchase amount of $200, the first user 102A may select the second and third payment options to pay $100 from each of the second and third payment modes, respectively. Thus, the first user 102A gets a total of $50 as cashback by paying $225 (i.e., $110 to the second user 102B and $115 to the third user).

Figure 6A:
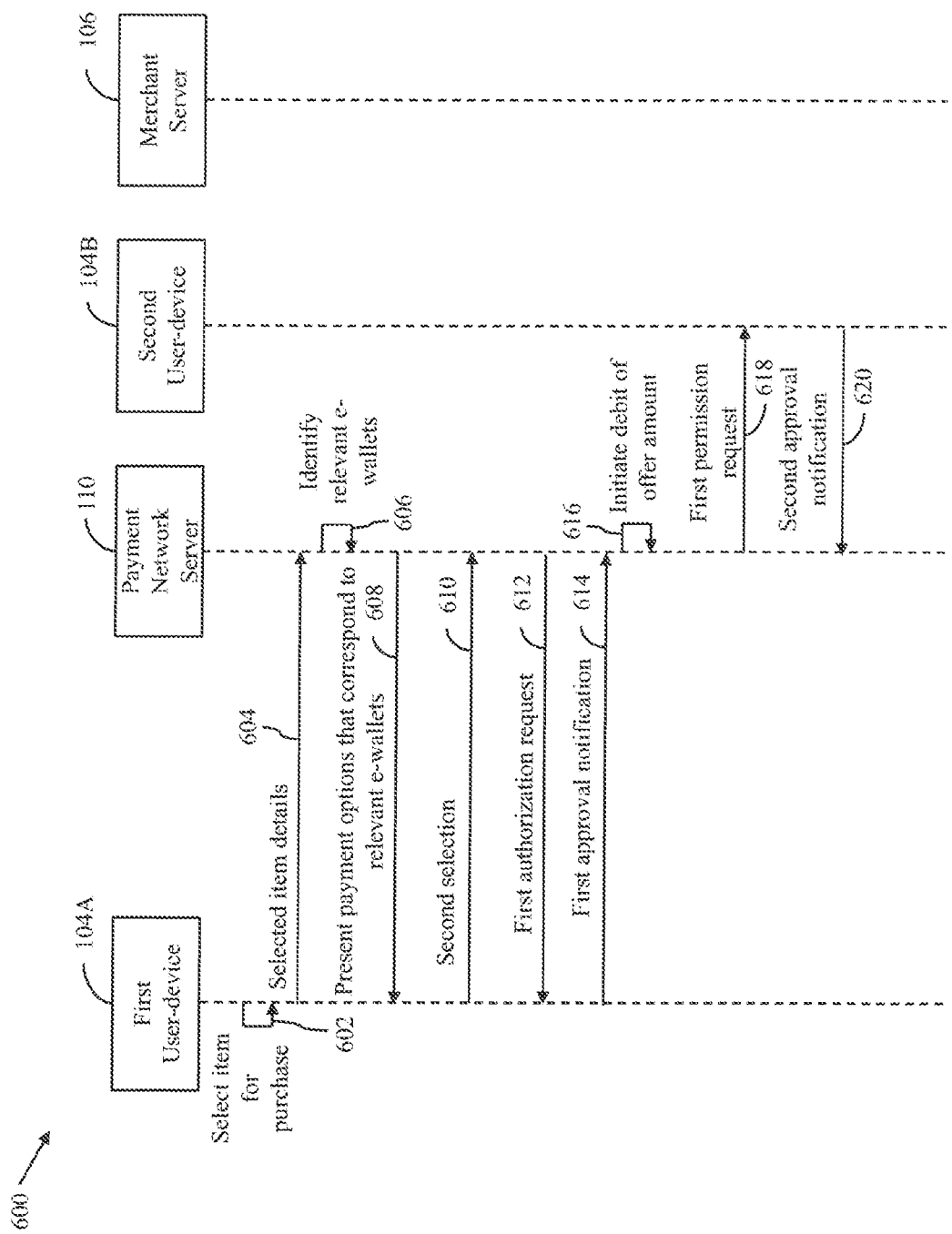
FIGS. 6A and 6B, collectively, represent a process flow diagram that illustrates another exemplary scenario for processing transactions, in accordance with an embodiment of the present invention.
Figure 6B:
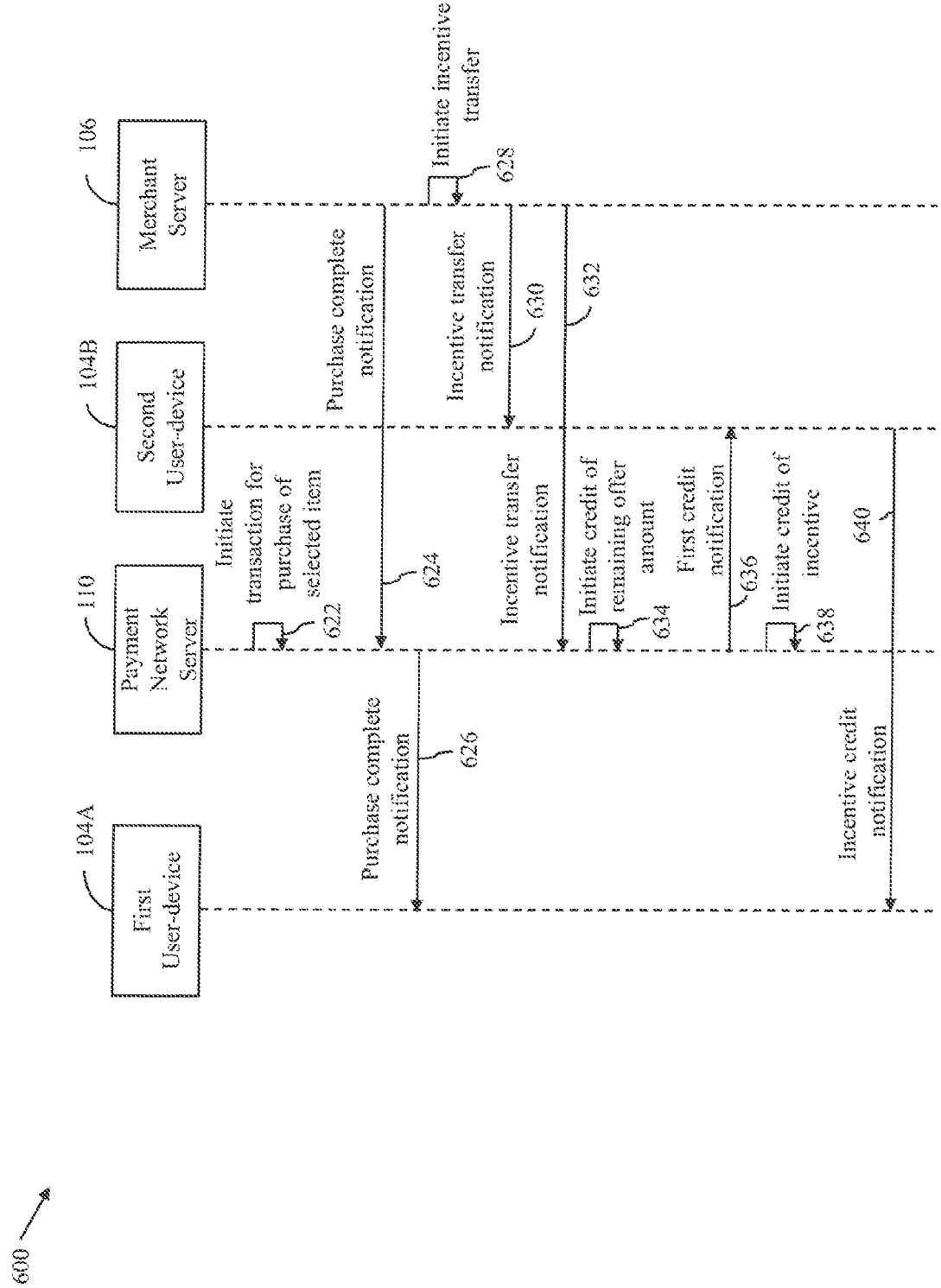

FIGS. 6A and 6B, collectively, represent a process flow diagram 600 that illustrates an exemplary scenario for processing transactions, in accordance with an embodiment of the present invention.

The process flow diagram 600 illustrates the first and second user-devices 104A and 104B, the merchant server 106, and the payment network server 110. The first user 102A logs in to the mobile application of the payment network server 110 in a similar manner as described in FIGS. 4A and 4B. The first user 102A has already registered the first e-wallet for availing the payment mode interchange service as described in FIG. 4B. When the first user 102A has successfully logged into the mobile application, the first user 102A selects an item that she intends to purchase from a catalogue of items listed for sale on the GUI of the mobile application rendered on the first user-device 104A (as shown by arrow 602). The mobile application transmits selected item details to the payment network server 110 (as shown by arrow 604). The selected item details include a type of the selected item, a purchase amount of the selected item, and an offer associated with the purchase of the selected item. In one example, the purchase amount of the selected item is $200 and the offer is a cashback of $50 if the selected item is purchased by using an e-wallet of "Brand-1". The first transceiver 206 receives the selected item details. In one embodiment, the first transaction manager 214 checks whether the offer associated with the purchase of the selected item is applicable on the registered first e-wallet of the first user 102A. For example, the registered first e-wallet is an e-wallet of "Brand-2". In such a scenario, the first transaction manager 214 determines that the offer is not applicable on the first e-wallet. Hence, the first transaction manager 214 identifies relevant e-wallets (i.e., e-wallets of "Brand-1") from the pool of registered e-wallets on which the offer associated with the purchase of the selected item is applicable (as shown by arrow 606). For example, the first transaction manager 214 identifies second through fourth e-wallets of the second user 102B, and the third and fourth users, respectively, on which the offer is applicable.

The first transaction manager 214 then retrieves fifth through seventh payment options as submitted by the second user 102B, and the third and fourth users, respectively, from the first memory 204. The fifth payment option indicates "$210 in exchange for paying $200 from the second e-wallet", the sixth payment option indicates "$215 in exchange for paying $200 from the third e-wallet", and the seventh payment option indicates "$220 in exchange for paying $200 from the fourth e-wallet". $210, $215, and $220 are fifth through seventh offer amounts of the second user 102B and third and fourth users with respect to the second through fourth e-wallets, respectively.

The first transaction manager 214 then presents the fifth through seventh payment options to the first user 102A through the GUI of the mobile application (as shown by arrow 608). In one embodiment, the first transaction manager 214 presents the best payment option at the top followed by other payment options. For example, since the fifth offer amount demanded by the second user 102B is least as compared to the sixth and seventh offer amounts, the first transaction manager 214 presents the fifth payment option at the top. The presented payment options are selectable by the first user 102A.

The first user 102A then compares the fifth through seventh payment options and may select one of the fifth through seventh payment options based on the comparison. It will be apparent to one skilled in the art the first user 102A may select any one of the presented payment options or may not select any of the presented payment options. For the sake of ongoing discussion, it is assumed that the first user 102A selects the fifth payment option.

The mobile application then communicates the selection (i.e., a second selection) of the fifth payment option to the payment network server 110 (as shown by arrow 610). The first transceiver 206 receives the second selection. Based on the second selection, the first authorization manager 212 communicates the first authorization request to the first user 102A for deducting the fifth offer amount (i.e., $210), demanded by the second user 102B in the fifth payment option, from the first block amount (as shown by arrow 612). The first user 102A approves the deduction of the fifth offer amount by communicating the first approval notification (as shown by arrow 614).

Based on the first approval notification received from the first user-device 104A, the first transaction manager 214 initiates a debit of the fifth offer amount (i.e., $210) from the first block amount (i.e., $1,000) (as shown by arrow 616). Once the fifth offer amount (i.e., $210) is debited from the first block amount, the remaining first block amount is $790 and the remaining first digital currency amount is 395 DC. In other words, the first transaction manager 214 charges the first e-wallet of the first user 102A with the fifth offer amount (i.e., $210) indicated by the fifth payment option that is selected by the first user 102A.

The first authorization manager 212 further transmits the first permission request to the second user-device 104B of the second user 102B for seeking a permission to use the second e-wallet for the purchase of the selected item (as shown by arrow 618). The second user 102B approves the use of the second e-wallet for the purchase of the selected item by communicating the second approval notification (as shown by arrow 620).

Based on the second approval notification, the first transaction manager 214 initiates a transaction for the purchase of the selected item by way of the second e-wallet (as shown by arrow 622). In other words, the first transaction manager 214 charges the second e-wallet with the purchase amount (i.e., $200) of the selected item. In one embodiment, the purchase amount is deducted from the second block amount of the second user 102B. The acquirer server 108 credits the merchant account in the acquirer bank with the purchase amount. When the purchase of the selected item is complete and the merchant receives the purchase amount in the merchant account, the merchant server 106 transmits the purchase complete notification to the payment network server 110 (as shown by arrow 624). The first transceiver 206 communicates the purchase complete notification to the first user-device 104A to inform the first user 102A that the purchase of the selected item is successfully completed (as shown by arrow 626). On the completion of the purchase, the merchant server 106 initiates a transfer of the incentive (i.e., $50) to the second e-wallet as the second e-wallet was used for making the purchase of the selected item from the merchant (as shown by arrow 628). The merchant server 106 transmits an incentive transfer notification to the second user-device 104B and the payment network server 110 (as shown by arrows 630 and 632) to indicate that the incentive is successfully transferred to the second e-wallet. The payment network server 110 ensures that the first user 102A receives the incentive transferred by the merchant server 106 and the second user 102B receives the fifth offer amount demanded by the second user 102B in the fifth payment option. For providing the fifth offer amount to the second user 102B, the first transaction manager 214 determines what part of the fifth offer amount (hereinafter referred to as "remaining fifth offer amount") is pending to be received by the second user 102B. The first transaction manager 214 determines the remaining fifth offer amount based on a difference of the fifth offer amount and the incentive that is already transferred by the merchant server 106 to the second user 102B. In this scenario, the remaining fifth offer amount is $210-$50=$160. The first transaction manager 214 initiates a credit of the remaining fifth amount (as shown by arrow 634). When the remaining amount is credited to the second e-wallet of the second user 102B, the first transaction manager 214, in conjunction with the first transceiver 206, communicates the first credit notification to the second user-device 104B to indicate that the fifth offer amount is successfully credited to the second e-wallet (as shown by arrow 636). For providing the incentive to the first user 102A, the first transaction manager 214 initiates a credit of the incentive (i.e., $50) in the first e-wallet of the first user 102A (as shown by arrow 638). When the incentive is credited to the first e-wallet of the first user 102A, the first transaction manager 214, in conjunction with the first transceiver 206, transmits the second credit notification to the first user-device 104A to indicate that the incentive provided by the merchant on the sale of the selected item is successfully credited to the first e-wallet (as shown by arrow 640). After the credit of the incentive (i.e., $50) the first block amount, which was $790 previously, is incremented by $50. The first transaction manager 214 further increments the remaining first digital currency amount (i.e., 395 DC) with a digital currency amount (25 DC) equivalent to the incentive (i.e., $50). Thus, the incremented first digital currency amount is 420 DC.

In another embodiment, the first user 102A may transmit a request to the payment network server 110 to present various payment options. The request includes a user-defined criterion, such as a specific category, brand, or type of the e-wallet. In such a scenario, the first transaction manager 214 identifies the relevant e-wallets based on the user-defined criterion in the request.

Figure 7A:
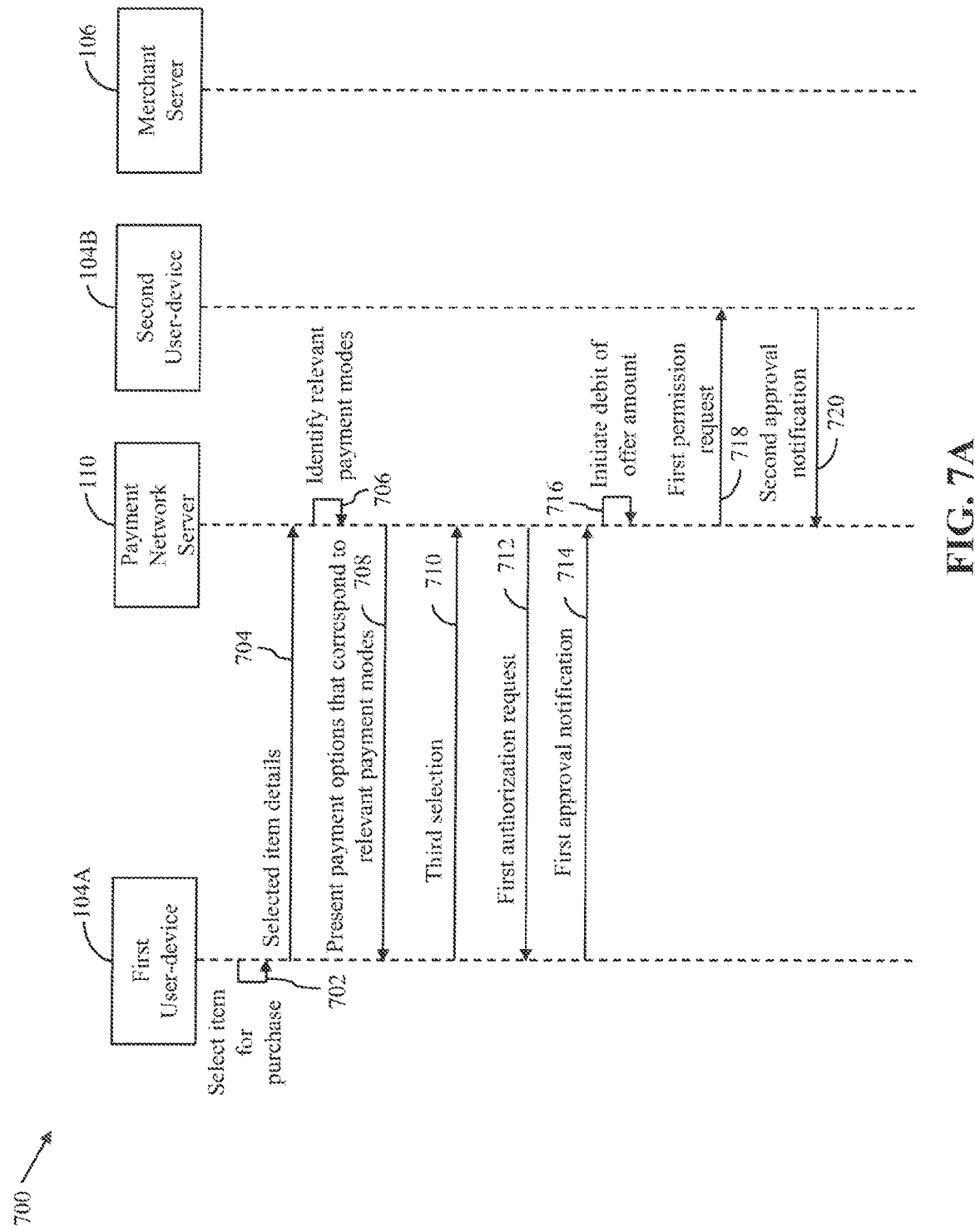
FIGS. 7A and 7B, collectively, represent a process flow diagram that illustrates another exemplary scenario for processing transactions, in accordance with an embodiment of the present invention.
Figure 7B:
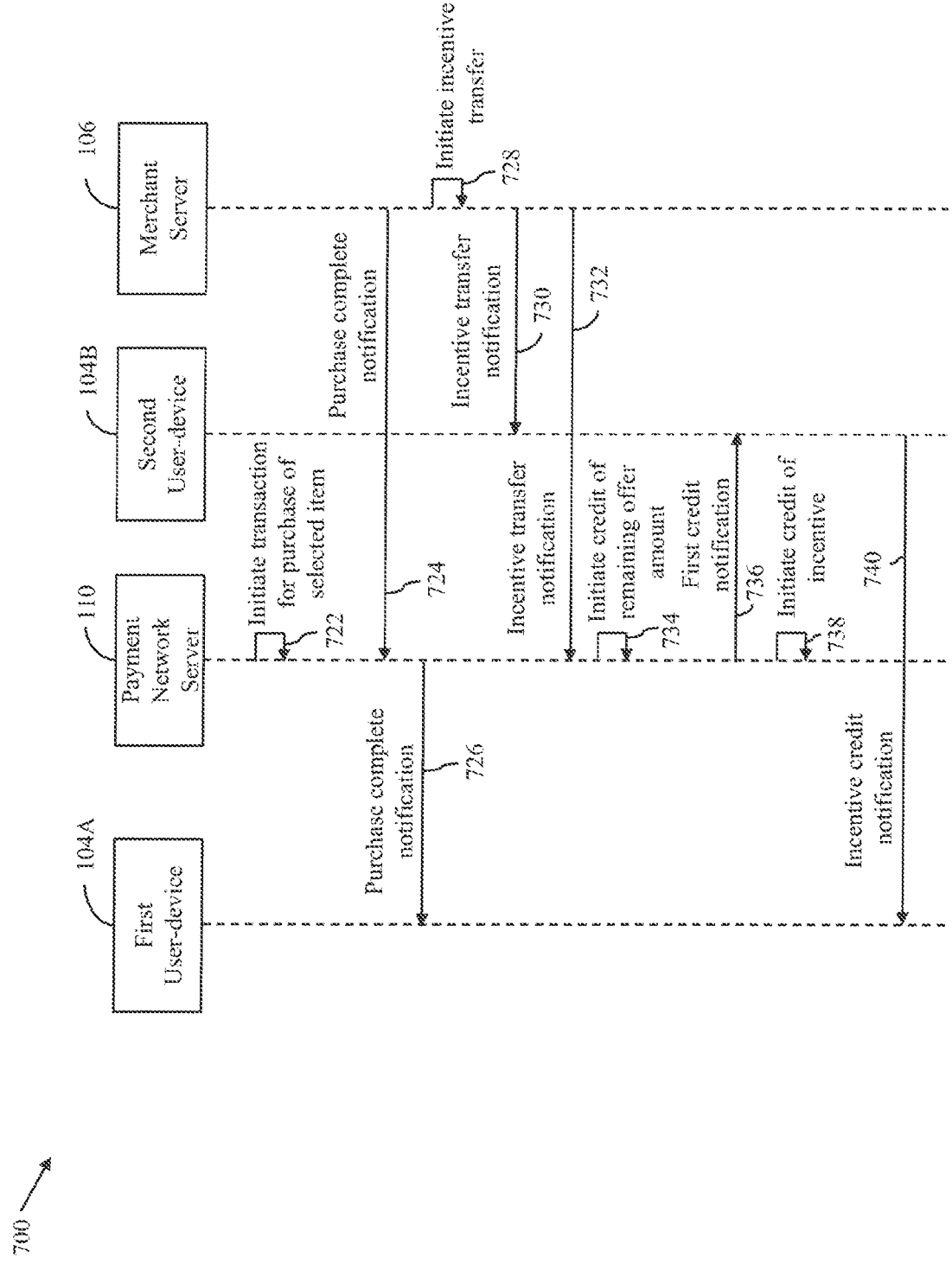

FIGS. 7A and 7B collectively represent a process flow diagram 700 that illustrates an exemplary scenario for processing transactions, in accordance with an embodiment of the present invention.

The process flow diagram 700 illustrates the first and second user-devices 104A and 104B, the merchant server 106, and the payment network server 110. The first user 102A logs in to the mobile application of the payment network server 110 in a similar manner as described in FIGS. 4A and 4B. The first user 102A has already registered the first e-wallet for availing the payment mode interchange service as described in FIG. 4B.

When the first user 102A has successfully logged into the mobile application, the first user 102A selects an item that she intends to purchase from a catalogue of items listed for sale on the GUI of the mobile application (as shown by arrow 702). The mobile application transmits selected item details to the payment network server 110 (as shown by arrow 704). The selected item details include a type of the selected item, a purchase amount of the selected item, and an offer associated with the purchase of the selected item. In one example, the purchase amount of the selected item is $100 and the offer is a cashback of $25 if the selected item is purchased by using a "Type-1" transaction card.

The first transceiver 206 receives the selected item details. In one embodiment, the first transaction manager 214 checks whether the offer associated with the purchase of the selected item is applicable on the registered first e-wallet of the first user 102A. In such a scenario, the first transaction manager 214 determines that the offer is not applicable on the first e-wallet. Hence, the first transaction manager 214 identifies relevant transaction cards (i.e., "Type-1" transaction cards) from the pool of registered payment modes on which the offer associated with purchase of the selected item is applicable (as shown by arrow 706). For example, the first transaction manager 214 identifies the second through fourth transaction cards of the second user 102B, and the third and fourth users, respectively, on which the offer is applicable.

The first transaction manager 214 then retrieves the second through fourth payment options (as described in FIGS. 5A and 5B), that were submitted by the second user 102B, and the third and fourth users, from the first memory 204. The first transaction manager 214 then presents the second through fourth payment options to the first user 102A through the GUI of the mobile application (as shown by arrow 708). The presented payment options are selectable by the first user 102A. The first user 102A then compares the second through fourth payment options for selection. For the sake of ongoing discussion, it is assumed that the first user 102A selects the second payment option.

The mobile application then communicates the selection (i.e., a third selection) of the second payment option to the payment network server 110 (as shown by arrow 710). The first transceiver 206 receives the third selection. Based on the third selection, the first authorization manager 212 communicates the first authorization request to the first user 102A for deducting the second offer amount (i.e., $110) from the first block amount (as shown by arrow 712). The first user 102A approves the deduction of the second offer amount by communicating the first approval notification (as shown by arrow 714).

Based on the first approval notification received from the first user-device 104A, the first transaction manager 214 initiates a debit of the second offer amount (i.e., $110) from the first block amount (i.e., $1,000) (as shown by arrow 716). After the deduction of the second offer amount (i.e., $110) from the first block amount, the remaining first block amount is $890 and the remaining first digital currency amount is 445 DC.

The first authorization manager 212 further transmits the first permission request to the second user-device 104B of the second user 102B for seeking a permission to use the second transaction card for the purchase of the selected item (as shown by arrow 718). The second user 102B approves the use of the second transaction card for the purchase of the selected item by communicating the second approval notification (as shown by arrow 720).

Based on the second approval notification, the first transaction manager 214 initiates a transaction for the purchase of the selected item by way of the second transaction card (as shown by arrow 722). In other words, the first transaction manager 214 bills the purchase amount (i.e., $100) of the selected item on the second transaction card. In one embodiment, the purchase amount is deducted from the second block amount of the second user 102B. The acquirer server 108 credits the merchant account in the acquirer bank with the purchase amount. When the purchase of the selected item is complete and the merchant receives the purchase amount in the merchant account, the merchant server 106 transmits a purchase complete notification to the payment network server 110 (as shown by arrow 724). The first transceiver 206 communicates the purchase complete notification to the first user-device 104A to inform the first user 102A that the purchase of the selected item is successfully completed (as shown by arrow 726). On the completion of the purchase, the merchant server 106 initiates the transfer of the incentive (i.e., $25) to the second user 102B as the second transaction card was used for making the purchase of the selected item from the merchant (as shown by arrow 728). The merchant server 106 transmits the incentive transfer notification to the second user-device 104B and the payment network server 110 (as shown by arrows 730 and 732) to indicate that the incentive is successfully transferred to the second user 102B. The payment network server 110 ensures that the first user 102A receives the incentive transferred by the merchant server 106 and the second user 102B receives the second offer amount. For providing the second offer amount to the second user 102B, the first transaction manager 214 determines the remaining second offer amount based on a difference of the second offer amount and the incentive that is already transferred by the merchant server 106 to the second user 102B. In this scenario, the remaining second offer amount is $110-$25=$85. The first transaction manager 214 initiates a credit of the remaining second offer amount to the second user account (as shown by arrow 734). When the remaining amount is credited to the second user account of the second user 102B, the first transaction manager 214, in conjunction with the first transceiver 206, communicates the first credit notification to the second user-device 104B to indicate that the second offer amount is successfully credited to the second user account (as shown by arrow 736). For providing the incentive to the first user 102A, the first transaction manager 214 initiates a credit of the incentive (i.e., $25) in the first e-wallet of the first user 102A (as shown by arrow 738). When the incentive is credited to the first e-wallet of the first user 102A, the first transaction manager 214, in conjunction with the first transceiver 206, transmits the second credit notification to the first user-device 104A to indicate that the incentive provided by the merchant on the sale of the selected item is successfully credited to the first e-wallet (as shown by arrow 740).

It will be apparent to a person having ordinary skill in the art that the first user 102A may have registered the first transaction card and the offer is applicable on an e-wallet. In this scenario, the payment network server 110 presents payment options to the first user 102A that are associated with the relevant e-wallets. Thus, the payment network server 110 enables users to use payment modes of other users for making purchases as per the user-defined criteria or the applicability of offers.

In another embodiment, the third-party server may host the mobile application or the website to offer the payment mode interchange service as offered by the payment network server 110 without deviating from the scope of the invention. In this scenario, the third-party server implements the process flow diagrams 400A, 400B, 500, 600, and 700 for offering the payment mode interchange service.

In one embodiment, the first user 102A is re-directed from a merchant website or a merchant mobile application to the mobile application or the website of the payment network server 110 for facilitating the transaction for the purchase of the item that the first user 102A has selected from the merchant website or the merchant mobile application.

Figure 8:
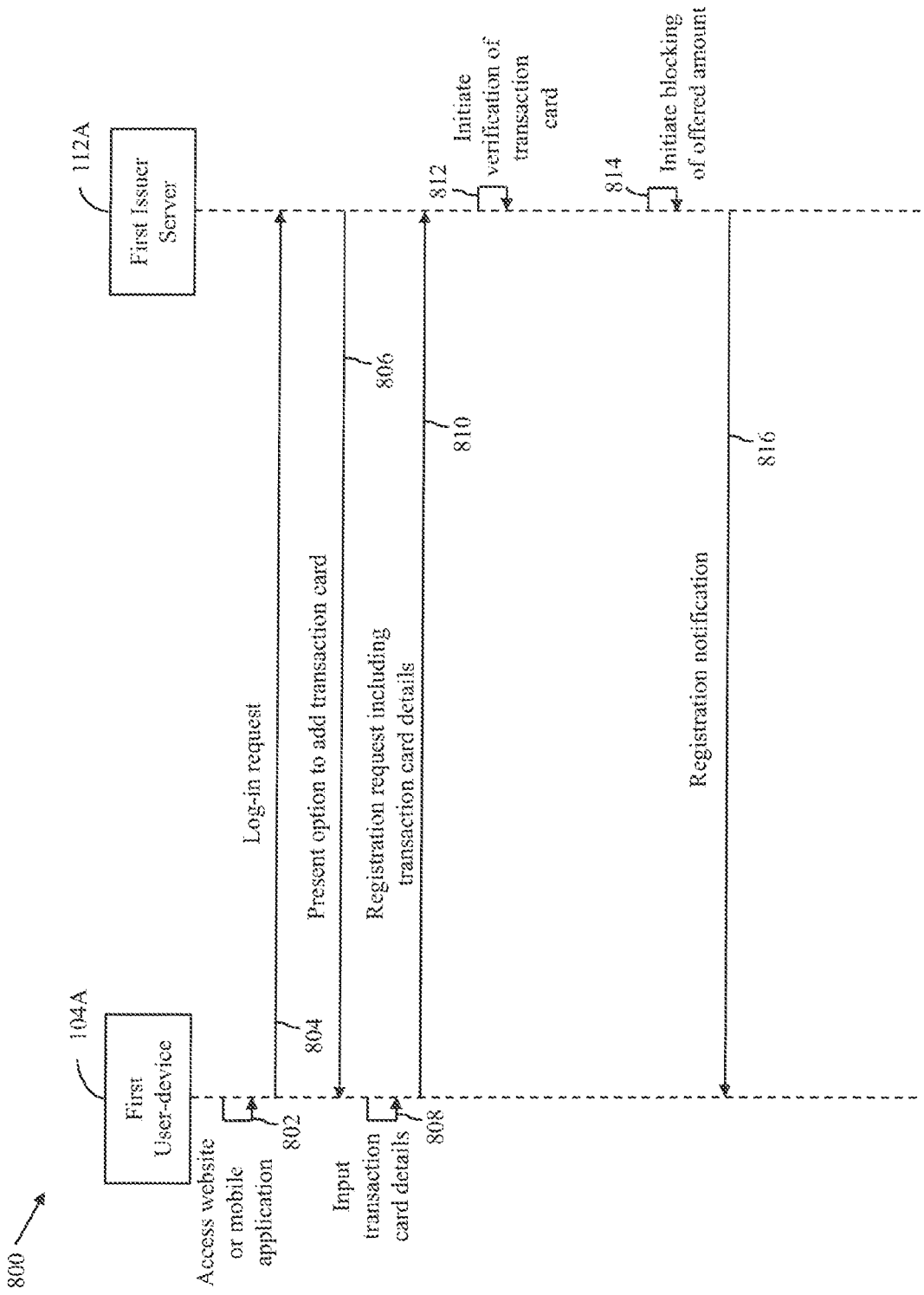
FIG. 8 is a process flow diagram that illustrates registration of a first payment mode for availing a payment mode interchange service offered by the first issuer server of the communication environment of FIG. 1, in accordance with another embodiment of the present invention.

FIG. 8 is a process flow diagram 800 that illustrates registration of the first payment mode of the first user 102A for availing the payment mode interchange service offered by the first issuer server 112A, in accordance with another embodiment of the present invention. The first issuer server 112A hosts the mobile application or the website that offers the payment mode interchange service to various users, such as the first user 102A. The payment mode interchange service enables the users to make purchases at various merchants, who have partnered with the first issuer server 112A. The first payment mode is the first transaction card of the first user 102A that is issued by the first issuer bank.

The first user 102A uses the first user-device 104A to access the mobile application or the website hosted by the first issuer server 112A for registering the first transaction card (as shown by arrow 802). In one embodiment, the first user 102A registers with the first issuer server 112A for accessing the mobile application in a similar manner as described in FIG. 4A. The first user 102A opens the mobile application on the first user-device 104A and the mobile application prompts the first user 102A to submit the corresponding login details, such as the login ID and the login password. The first user 102A submits the login details on the mobile application and a log-in request is thus initiated.

The second transceiver 306 receives the log-in request from the first user-device 104A (as shown by arrow 804). The second registration manager 310 retrieves the login details from the log-in request and fetches a user profile of the first user 102A from the second memory 304, based on the login ID. The second registration manager 310 further compares the login password submitted by the first user 102A with the login password stored in the user profile of the first user 102A. When the login password submitted by the first user 102A matches the login password stored in the user profile, the second registration manager 310 grants the first user 102A an access to the mobile application and the login is successful.

When the first user 102A is granted access to the mobile application, the second registration manager 310 presents an option to the first user 102A through the GUI of the mobile application to add a transaction card issued by the first issuer bank for registration (as shown by arrow 806). The first user 102A selects the option presented on the GUI to add the first transaction card issued by the first issuer bank. When the first user 102A selects the option, the second registration manager 310 prompts the first user 102A to submit details of the transaction card which the first user 102A wants to register and the first block amount that the first user 102A wants to block from a user account or available credit line linked to the transaction card. The first user 102A thus submits the details of the first transaction card and the first block amount (for example $1,000) (as shown by arrow 808). The details of the first transaction card include the unique card number, the card security code, and the expiry date of the first transaction card. The details of the first transaction card and the first block amount as submitted by the first user 102A are communicated to the first issuer server 112A by way of the registration request (as shown by arrow 810).

The second transceiver 306 receives the details of the first transaction card and the first block amount from the first user-device 104A. The second authorization manager 312 initiates a verification of the first transaction card based on the details of the first transaction card (as shown by arrow 812). To verify the first transaction card, the second authorization manager 312 compares the details of the first transaction card against the transaction card details of multiple users stored in the second memory 304. If the second authorization manager 312 finds a match for the first transaction card, the second authorization manager 312 determines that the first transaction card is verified, else, the first transaction card is not verified.

In one embodiment, the mobile application may prompt the first user 102A to re-submit the details of the first transaction card, when the result of the verification indicates that the first transaction card is not verified. In another embodiment where the result of the verification indicates that the first transaction card is verified, the second registration manager 310 registers the first transaction card and initiates a blocking of the first block amount from the first user account or the available credit line linked to the first transaction card (as shown by arrow 814).

For blocking the first block amount from the first user account or the available credit line, the second registration manager 310 checks whether the first user account has sufficient funds to cover the first block amount. The funds may correspond to an account balance of the first user account linked to the first transaction card or the available credit line of the first user account. In one scenario where the second registration manager 310 determines that the first user account has sufficient funds to cover the first block amount, the second registration manager 310 prompts the first user 102A to authorize the blocking of the first block amount from the first user account. Based on an approval from the first user 102A, the second registration manager 310 blocks the first block amount from the first user account or the available credit line. Once the first block amount is blocked, the first transaction card is registered with the first issuer server 112A for the payment mode interchange service. The second registration manager 310 updates the user profile of the first user 102A stored in the second memory 304 to include the details of the first transaction card that is registered.

Once the first block amount is successfully blocked from the first user account or the available credit line of the first transaction card, the second registration manager 310 communicates a registration notification to the first user 102A through the mobile application to indicate that the first transaction card is successfully registered with the first issuer server 112A (as shown by arrow 816). The first transaction card is then added to a list of registered payment modes of the first user 102A and thus can be used to avail the payment mode interchange service while making purchases at various merchants that have partnered with the first issuer server 112A.

The first user 102A further submits the first payment option based on which the first issuer server 112A is allowed to use the first transaction card for initiating a transaction for a purchase made by another user. The first payment option indicates the first offer amount that is demanded by the first user 102A in exchange for paying a purchase amount for the other user through the first transaction card as explained in FIG. 4A. The second registration manager 310 links the registered first transaction card to the first payment option submitted by the first user 102A.

In one embodiment, the second registration manager 310 allocates a first digital currency amount equivalent to the first block amount and updates the user profile of the first user 102A stored in the second memory 304 to include the first digital currency amount. For example, when 1 DC=$2 (where DC is the digital currency unit), the second registration manager 310 allocates 500 DC to the first user 102A that is equivalent to $1,000 (i.e., the first block amount).

It will be apparent to a person having ordinary skill in the art that other users may also register their transaction cards issued by the first issuer bank with the first issuer server 112A for availing the payment mode interchange service. Thus, the first issuer server 112A maintains a pool of registered transaction cards and the corresponding payment options.

Figure 9A:
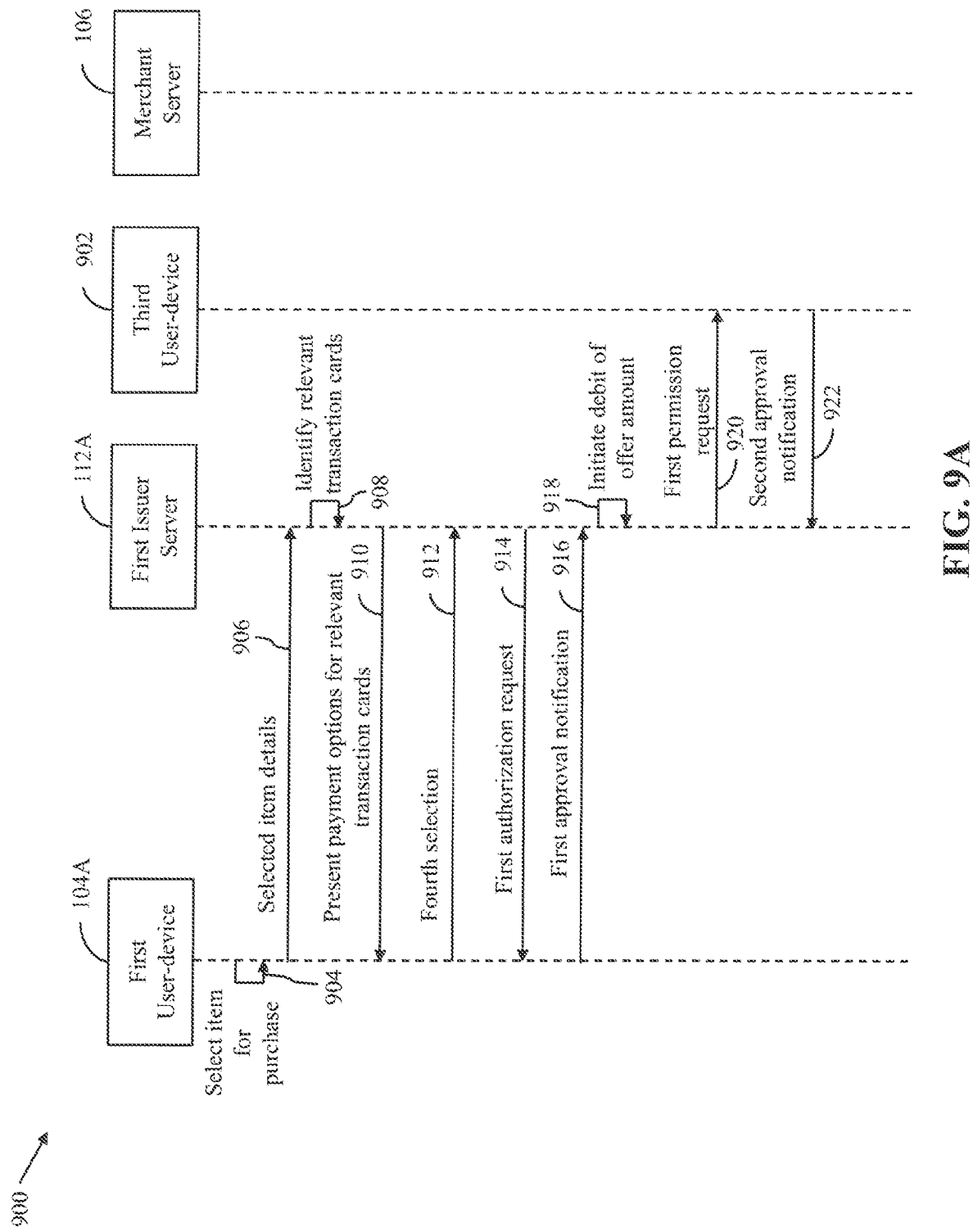
FIGS. 9A and 9B, collectively, represent a process flow diagram that illustrates an exemplary scenario for processing transactions, in accordance with another embodiment of the present invention.
Figure 9B:
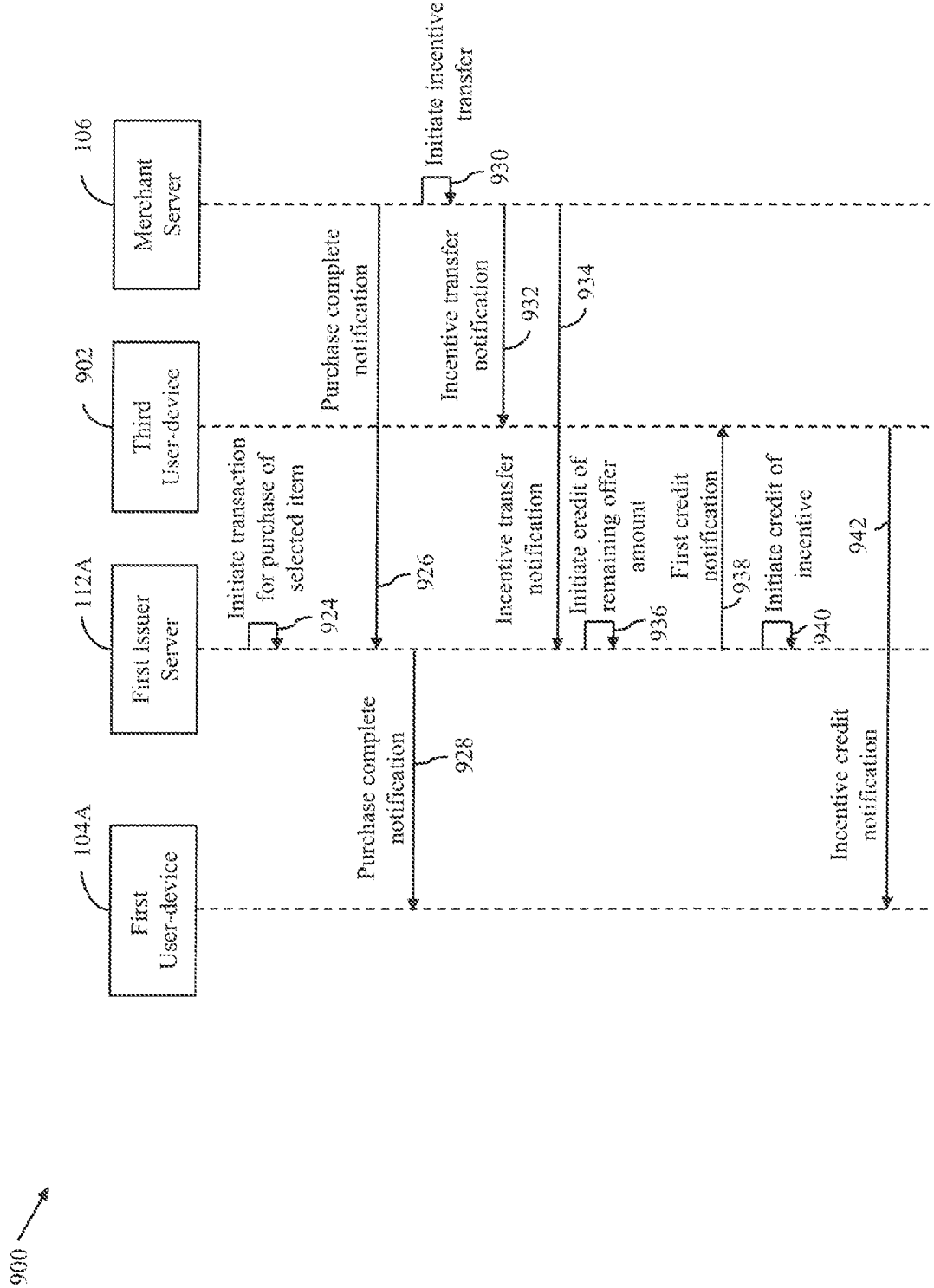

FIGS. 9A and 9B collectively represent a process flow diagram 900 that illustrates an exemplary scenario for processing transactions, in accordance with another embodiment of the present invention. The process flow diagram 900 illustrates the first user-device 104A and a third user-device 902. The third user-device 902 belongs to a third user (not shown) who has a third user account in the first issuer bank and has a third transaction card issued by the first issuer bank. The third user-device 902 is functionally similar to the first and second user-devices 104A and 104B. The process flow diagram 900 further illustrates the merchant server 106 and the first issuer server 112A.

The first user 102A logs in to the mobile application of the first issuer server 112A in a similar manner as described in FIG. 8. The first user 102A has already registered the first transaction card for availing the payment mode interchange service as described in FIG. 8. When the first user 102A has successfully logged into the mobile application, the first user 102A selects an item that she intends to purchase (as shown by arrow 904). The mobile application transmits details of the selected item to the first issuer server 112A (as shown by arrow 906). The selected item details include a type of the selected item, a purchase amount of the selected item (for example, $100), and an offer offered by the merchant on the sale of the selected item. In one example, the offer is a cashback of $25 if the selected item is purchased by using a "Category-1" transaction card.

The second transceiver 306 receives the selected item details. In one embodiment, the second transaction manager 314 checks whether the offer on the sale of the selected item is applicable on the registered first transaction card of the first user 102A. In an exemplary scenario, the registered first transaction card is a "Category-2" transaction card. Thus, the second transaction manager 314 determines that the offer is not applicable on the first transaction card. In such a scenario, the second transaction manager 314 identifies relevant transaction cards from the pool of registered transaction cards on which the offer is applicable (as shown by arrow 908). For example, the second transaction manager 314 identifies the third transaction card of the third user on which the offer is applicable. The second transaction manager 314 then retrieves the third payment option as submitted by the third user during the registration of the third transaction card from the second memory 304. The third payment option indicates "$115 in exchange for paying $100 from the third transaction card. $115 is the third offer amount of the third user with respect to the third transaction card.

The second transaction manager 314 then presents the third payment option to the first user 102A through the GUI of the mobile application (as shown by arrow 910). It will be apparent to a person having ordinary skill in the art that the count of presented payment options is not limited to one. The presented payment option is selectable by the first user 102A. For the sake of ongoing discussion, it is assumed that the first user 102A selects the third payment option.

The mobile application then communicates the selection (i.e., a fourth selection) of the third payment option to the first issuer server 112A (as shown by arrow 912). The second transceiver 306 receives the fourth selection. Based on the fourth selection, the second authorization manager 312 communicates the first authorization request to the first user 102A for deducting the third offer amount (i.e., $115) from the first block amount (as shown by arrow 914). The first user 102A approves the deduction of the third offer amount by communicating the first approval notification (as shown by arrow 916).

Based on the first approval notification received from the first user-device 104A, the second transaction manager 314 initiates a debit of the third offer amount (i.e., $115) from the first block amount (i.e., $1,000) (as shown by arrow 918). Once the third offer amount (i.e., $115) is debited from the first block amount, the remaining first block amount is $885. In other words, the second transaction manager 314 charges the first transaction card of the first user 102A with the third offer amount (i.e., $115) indicated by the third payment option that is selected by the first user 102A.

The first authorization manager 212 further transmits the first permission request to the third user-device 902 of the third user for seeking a permission from the third user to use the third transaction card for the purchase of the selected item (as shown by arrow 920). The first permission request indicates the purchase amount of the selected item to the third user. The third user approves the use of the third transaction card for the purchase of the selected item by communicating the second approval notification (as shown by arrow 922). In another embodiment, the third user may not approve the use of the third transaction card for the purchase of the selected item, in such a scenario, the second transaction manager 314 rolls back the third offer amount to the first user account and prompts the first user 102A to re-select one of the payment option or the registered first transaction card for making the purchase of the selected item.

Based on the second approval notification, the second transaction manager 314 initiates a transaction for the purchase of the selected item by way of the third transaction card (as shown by arrow 924). In other words, the second transaction manager 314 bills the purchase amount (i.e., $100) of the selected item on the third transaction card. In one embodiment, the purchase amount is deducted from a third block amount of the third user. The acquirer server 108 credits the merchant account in the acquirer bank with the purchase amount. When the purchase of the selected item is complete and the merchant receives the purchase amount in the merchant account, the merchant server 106 transmits a purchase complete notification to the first issuer server 112A (as shown by arrow 926). The second transceiver 306 communicates the purchase complete notification to the first user-device 104A to inform the first user 102A that the purchase of the selected item is successfully completed (as shown by arrow 928). On the completion of the purchase, the merchant server 106 initiates the transfer of the incentive (i.e., $25) to the third user as the third transaction card was used for making the purchase of the selected item from the merchant (as shown by arrow 930). The merchant server 106 transmits an incentive transfer notification to the third user-device 902 and the first issuer server 112A (as shown by arrows 932 and 934) to indicate that the incentive is successfully transferred to the third user. The first issuer server 112A ensures that the first user 102A receives the incentive transferred by the merchant server 106 and the third user receives the third offer amount as indicated by the third payment option. For providing the third offer amount to the third user, the second transaction manager 314 determines what part of the third offer amount (hereinafter referred to as "remaining third offer amount") is pending to be received by the second user 102B. The second transaction manager 314 determines the remaining third offer amount based on a difference of the third offer amount and the incentive that is already transferred by the merchant server 106 to the third user. In this scenario, the remaining third offer amount is $115-$25=$90. The first transaction manager 214 initiates a credit of the remaining third offer amount to the third user account (as shown by arrow 936). When the remaining third offer amount is credited to the third user account of the third user, the second transaction manager 314, in conjunction with the second transceiver 306, communicates the first credit notification to the third user-device 902 to indicate that the third offer amount is successfully credited to the third user account (as shown by arrow 938). For providing the incentive to the first user 102A, the second transaction manager 314 initiates a credit of the incentive (i.e., $25) to the first user account of the first user 102A (as shown by arrow 940). When the incentive is credited to the first user account of the first user 102A, the second transaction manager 314, in conjunction with the second transceiver 306, transmits the second credit notification to the first user-device 104A to indicate that the incentive provided by the merchant is successfully credited to the first user account (as shown by arrow 942). Thus, by availing the payment mode interchange service, the first user 102A pays $90 (i.e., $115-$25) instead of $100 for the purchase of the selected item and the second user 102B earns a profit of $15 (i.e., $25+$90-$100).

In another embodiment, the first user 102A may transmit a request to the first issuer server 112A to present various payment options. The request includes a user-defined criterion, such as a specific category, brand, or type of the transaction card. In such a scenario, the second transaction manager 314 identifies the relevant transaction cards based on the user-defined criterion in the request.

It will be apparent to a person having ordinary skill in the art that the first digital currency allocated to the first user 102A is updated by the second transaction manager 314 based on an increment or a decrement in the first block amount of the first user 102A.

Figure 10:
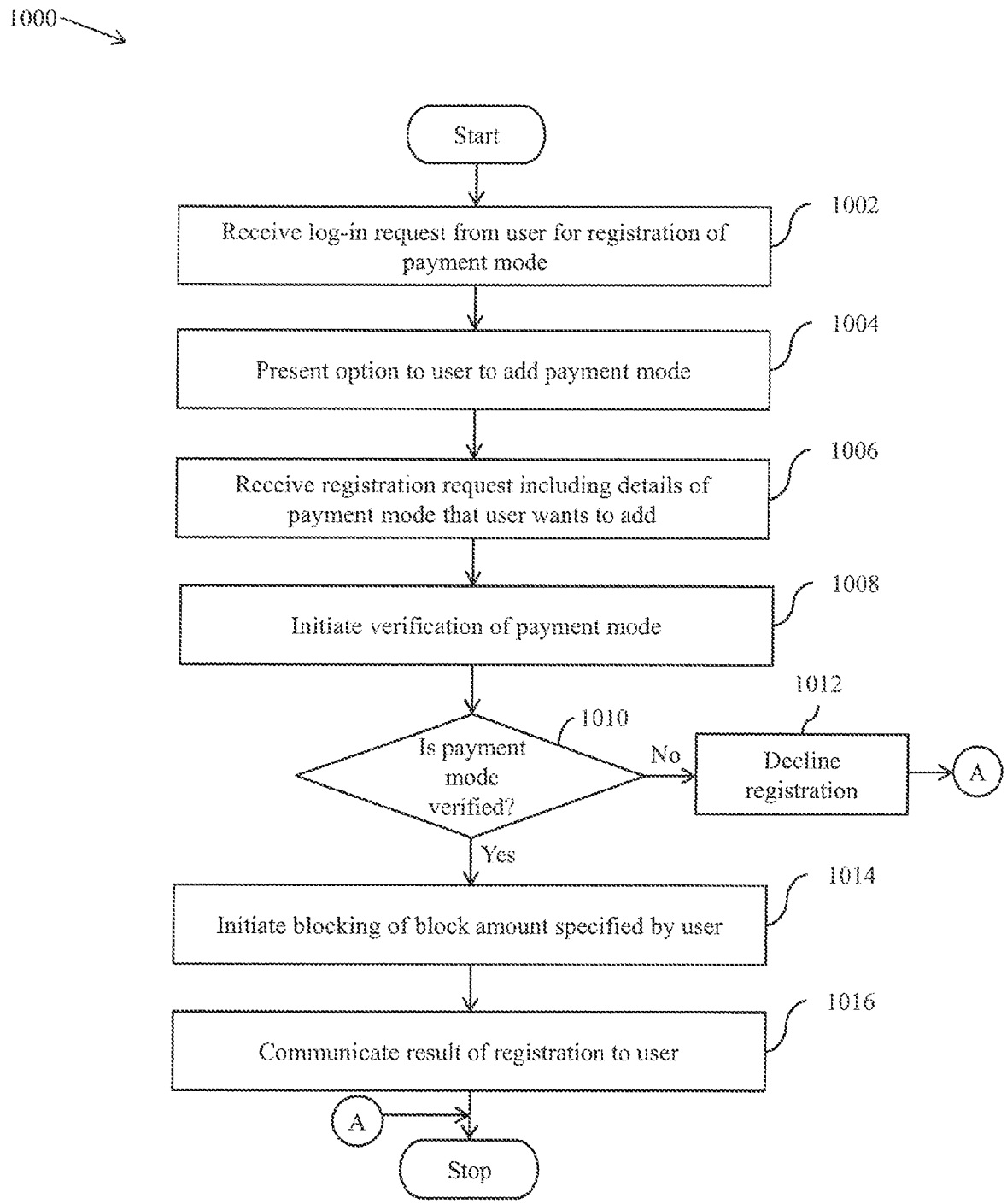
FIG. 10 represents a flow chart that illustrates a method for registering a payment mode, in accordance with an embodiment of the present invention.

FIG. 10 is a flow chart 1000 that illustrates the method for registering a payment mode, in accordance with an embodiment of the present invention. For the sake of simplicity, the flow chart 1000 is explained with respect to the first user 102A. However, it will be apparent to a person skilled in the art that any other user, such as the second user 102B, can register her payment mode by the method illustrated in the flow chart 1000.

The first user 102A uses the first user-device 104A to access the mobile application (or the website) hosted by the payment network server 110 for registering the first payment mode. The first user 102A opens the mobile application on the first user-device 104A and the mobile application prompts the first user 102A to submit the corresponding login details. The first user 102A submits the login details on the mobile application and a log-in request is thus initiated.

At step 1002, the payment network server 110 receives the log-in request from the first user-device 104A. Based on the log-in request the first user 102A is granted access to the mobile application and the login is successful. At step 1004, the payment network server 110 presents an option to the first user-device 104A through the GUI of the mobile application to add a payment mode that the first user 102A wants to register. The GUI is displayed on the display of the first user-device 104A. The first user 102A selects the option presented on the GUI to add the first payment mode (such as the first transaction card or the first e-wallet). The first user 102A submit details of the first payment mode and a first block amount that the first user 102A wants to block from the first user account or the available credit line linked to the first payment mode. The details of the first payment mode and the block amount as submitted by the first user 102A are communicated by way of a registration request to the payment network server 110.

At step 1006, the payment network server 110 receives the registration request including the details of the first payment mode and the first block amount from the first user-device 104A. At step 1008, the payment network server 110 initiates a verification of the first payment mode based on the details of the first payment mode. At step 1010, the payment network server 110 checks whether the first payment mode is verified. If at step 1010, it is determined that the payment mode is not verified, step 1012 is performed. At step 1010, the payment network server 110 declines the registration of the first payment mode and notifies the first user 102A. If at step 1010, it is determined that the first payment mode is verified, step 1014 is performed.

At step 1014, the payment network server 110 initiates a blocking of the first block amount from the first user account or the available credit line linked to the first payment mode. At step 1016, the payment network server 110 communicates a registration notification to the first user 102A through the mobile application to indicate that the first payment mode is successfully registered with the payment network server 110.

In another embodiment, the first issuer server 112A, the second issuer server 112B, or the third-party server may perform the method illustrated in the flow chart 1000 for registering various payment modes of various users, without departing from the scope of the invention.

Figure 11A:
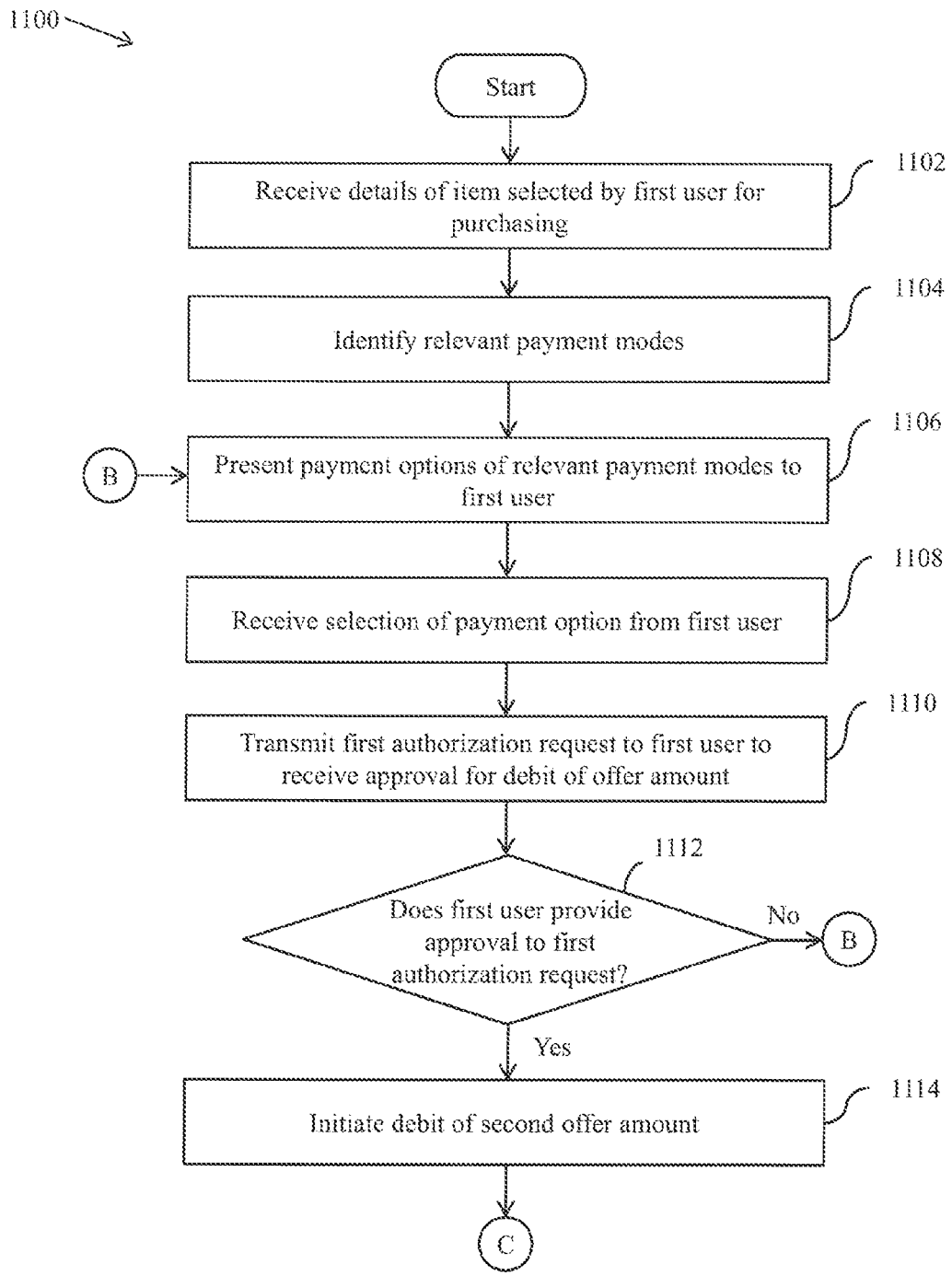
FIGS. 11A and 11B, collectively, represent a flow chart that illustrates a method for facilitating transactions for online purchases, in accordance with an embodiment of the present invention.
Figure 11B:
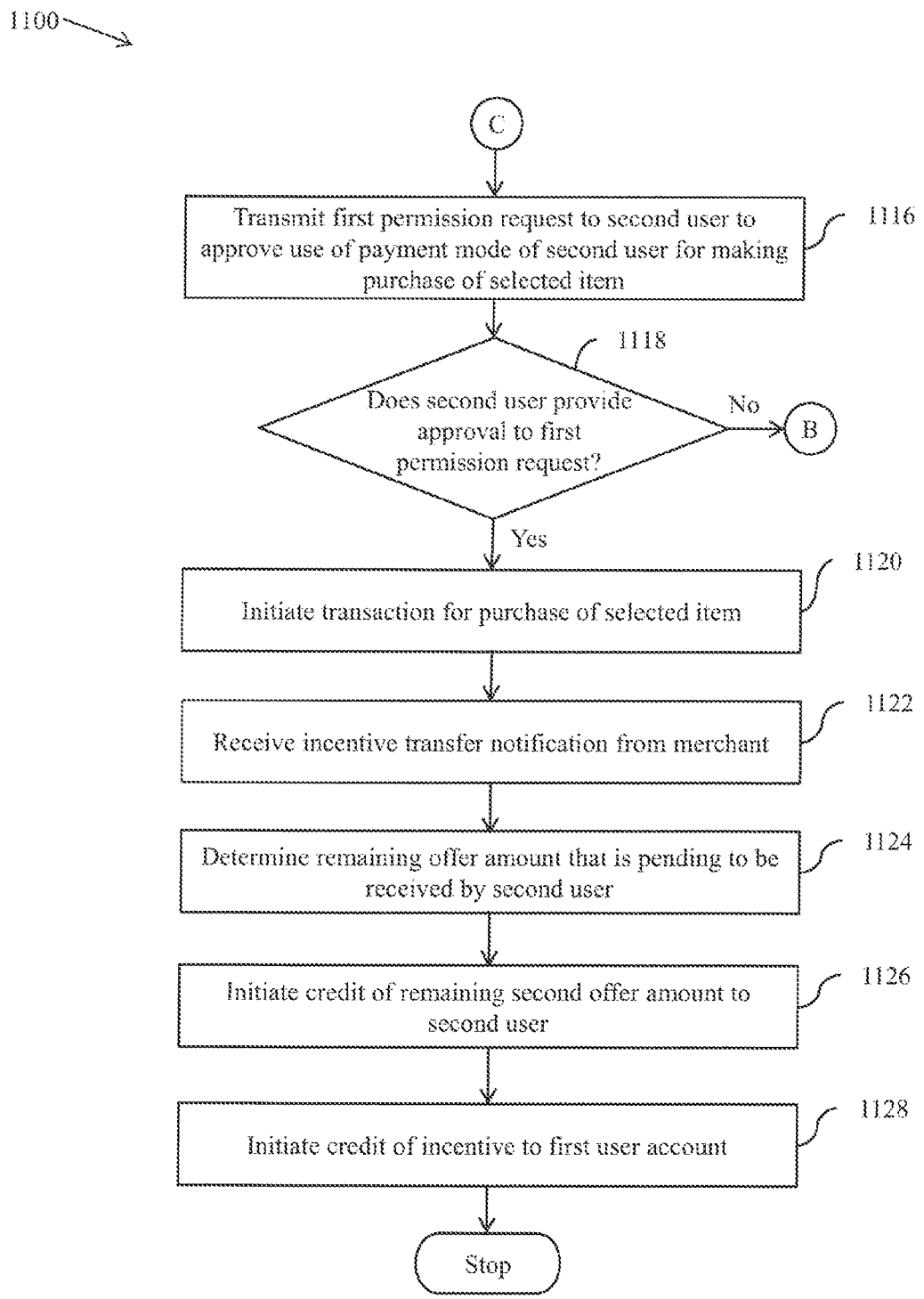

FIGS. 11A and 11B collectively represent a flow chart 1100 that illustrates the method for processing transactions for online purchases, in accordance with an embodiment of the present invention. For the sake of simplicity, the flow chart 1100 is explained with respect to the first and second users 102A and 102B. However, it will be apparent to a person skilled in the art that other users can also make online purchases by the method illustrated in the flow chart 1100. The first user 102A has already registered the first payment mode for availing the payment mode interchange service as described in FIGS. 4A and 4B. When the first user 102A has successfully logged into the mobile application of the payment network server 110, the first user 102A browses through a catalogue of items listed for sale on the GUI of the mobile application. The first user 102A selects an item that she intends to purchase from the catalogue of items. The mobile application transmits details of the selected item to the payment network server 110.

At step 1102, the payment network server 110 receives the selected item details from the mobile application. In a scenario where there is an offer available on the sale of the selected item, the payment network server 110 checks whether the offer is applicable on the registered first payment mode of the first user 102A. In a scenario where the offer is not applicable on the first payment mode, step 1104 is performed. At step 1104, the payment network server 110 identifies the relevant payment modes from the pool of registered payment modes on which the offer is applicable. The payment network server 110 may further identify the relevant payment modes from the pool of registered payment modes based on the user-specific criterion. For the sake of ongoing discussion, it is assumed that the payment network server 110 identifies the second payment mode of the second user 102B as the relevant payment mode. The payment network server 110 then retrieves the second payment option corresponding to the second payment mode.

At step 1106, the payment network server 110 presents the second payment option to the first user 102A through the GUI of the mobile application. The first user 102A selects the second payment option for making the purchase of the selected item. It will be apparent to one skilled in the art the first user 102A may not select any one of the presented payment options and may select the first payment mode for making the purchase of the selected item. The mobile application communicates the selection of the second payment option to the payment network server 110.

At step 1108, the payment network server 110 receives the selection of the second payment option. At step 1110, the payment network server 110 transmits the first authorization request to the first user 102A to receive an approval for debiting the second offer amount, demanded by the second user 102B in the second payment option, from the first block amount. The first user 102A responds to the first authorization request by way of the first approval notification. At step 1112, the payment network server 110 checks whether the first user 102A has provided approval to the first authorization request based on the first approval notification. If at step 1112, it is determined that the first user 102A has not approved the first authorization request, step 1106 is performed where the payment network server 110 prompts the first user 102A to re-select one of the presented payment options or the registered first payment mode for making the purchase of the selected item. If at step 1112, it is determined the first user 102A has approved the deduction of the second offer amount, step 1114 is performed.

At step 1114, the payment network server 110 initiates the debit of the second offer amount from the first block amount. At step 1116, the payment network server 110 further transmits the first permission request to the second user 102B to approve the use of the second payment mode for making the purchase of the selected item on behalf of the first user 102A in exchange for the second offer amount. The first permission request indicates the purchase amount of the selected item to the second user 102B. The second user 102B responds to the first permission request by way of the second approval notification.

At step 1118, the payment network server 110 checks whether the second user 102B has provided the approval to the first permission request. If at step 1118, it is determined that the second user 102B has rejected the first permission request, step 1106 is performed where the payment network server 110 presents the payment options again to the first user 102A and prompts the first user 102A to re-select one of the payment option or the registered first payment mode for making the purchase of the selected item. Further, the debited second offer amount is rolled back to the first user account of the first user 102A. If at step 1118, it is determined that the second user 102B has approved the first permission request, step 1120 is performed.

At step 1120, the payment network server 110 initiates a transaction for the purchase of the selected item by way of the second payment mode of the second user 102B. In other words, the payment network server 110 bills the purchase amount of the selected item on the second payment mode. At step 1122, the payment network server 110 receives the incentive transfer notification from the merchant after the purchase of the selected item is completed. The incentive transfer notification indicates that the incentive associated with the sale of the selected item is successfully transferred to the second user 102B.

At step 1124, the payment network server 110 determines what part of the second offer amount (i.e., the remaining second offer amount) is pending to be received by the second user 102B. The payment network server 110 determines the remaining second offer amount based on the difference of the second offer amount and the incentive that is already transferred by the merchant to the second user 102B. At step 1126, the payment network server 110 initiates the credit of the remaining second offer amount to the second user 102B. At step 1128, the payment network server 110 initiates the credit of the incentive to the first user account of the first user 102A (as explained in FIGS. 5A and 5B, 6A and 6B, 7A and 7B). Thus, the first user 102A receives the incentive that was associated with the offer offered by the merchant and the second user 102A earns some profits based on the second offer amount.

In another embodiment, the first issuer server 112A, the second issuer server 112B, or the third-party server may offer the payment mode interchange service for facilitating transactions for online purchases by performing the method illustrated in the flow chart 1100, without departing from the scope of the invention.

Figure 12:
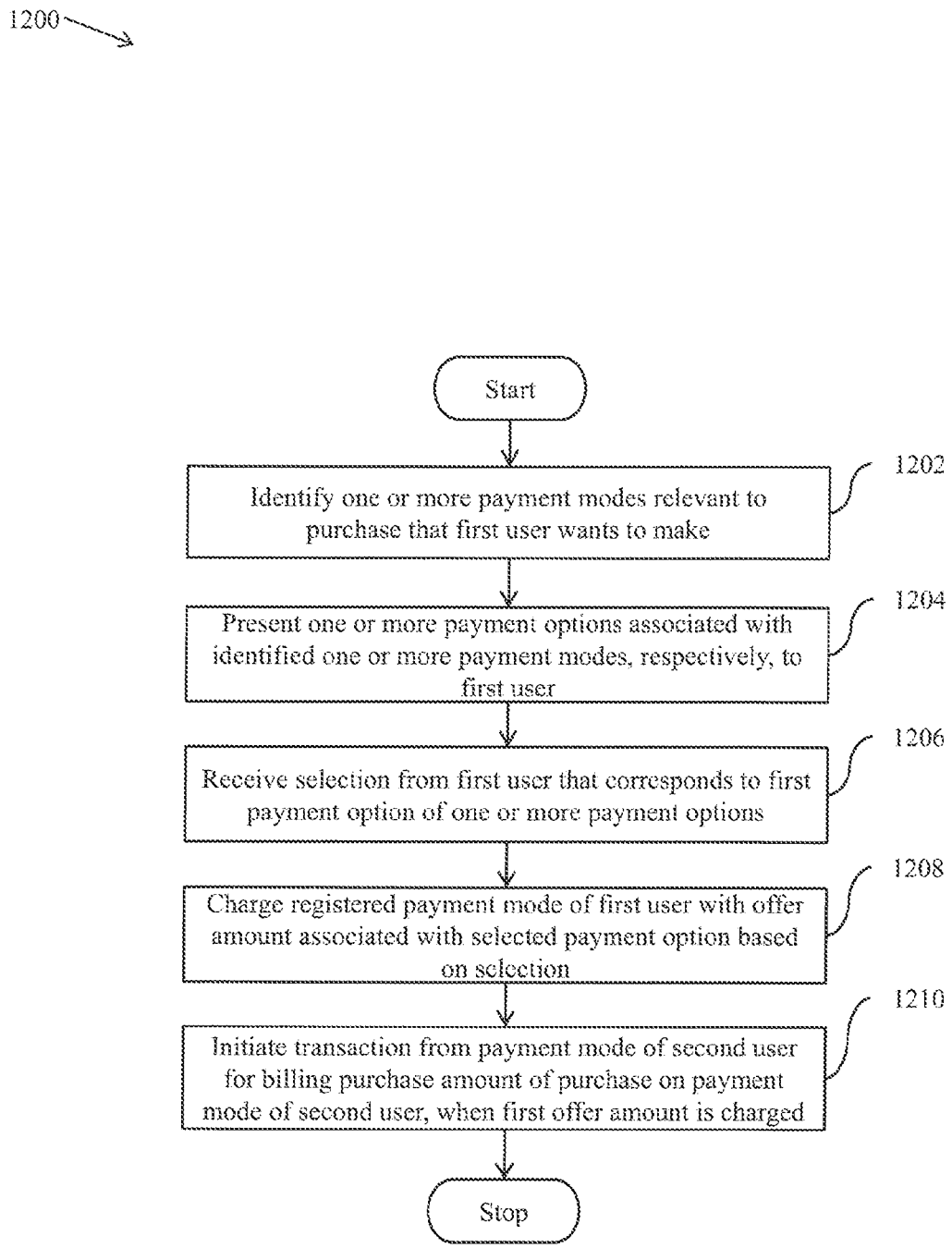
FIG. 12 represents a high-level flow chart that illustrates a method for facilitating transactions for online purchases, in accordance with an embodiment of the present invention.

FIG. 12 is a high-level flow chart 1200 that illustrates the method for facilitating transactions for online purchases, in accordance with an embodiment of the present invention. The first user 102A selects an item that she intends to purchase by using the payment mode interchange service provided by circuitry of a server. The server may be one the payment network server 110, the first issuer server 112A, the third-party server, or the like, which hosts the mobile application or the website for providing the payment mode interchange service to the first user 102A.

At step 1202, the circuitry identifies one or more payment modes that are relevant to the purchase that the first user 102A wants to make. The circuitry may identify the relevant payment modes based on an offer associated with the purchase of the selected item. At step 1204, the circuitry presents one or more payment options that are associated with the identified payment modes, respectively, to the first user 102A. The one or more payment options are presented by way of a GUI rendered on the first user-device 104A. The presented payment options are selectable by the first user 102A.

At step 1206, the circuitry receives a selection from the first user 102A that corresponds to a payment option of the one or more payment options. For example, the selected payment option is the second payment option associated with the registered payment mode of the second user 102B. At step 1208, the circuitry charges the registered payment mode of the first user 102A with an offer amount associated with the selected payment option based on the selection. At step 1210, the circuitry initiates a transaction from the registered payment mode of the second user 102B for billing the purchase amount of the purchase on the registered payment mode of the second user 102B, when the offer amount is charged. The first user 102A receives the incentive associated with the offer, when the transaction is complete.

The method and system of the present invention enables a user (such as the first or second user 102A or 102B) to avail an offer offered by a merchant on a specific category, brand, or type of a payment mode (such as a transaction card or an e-wallet), even when the user does not possess the specific category, brand, or type of the payment mode. The method and system are beneficial for both the first user 102A, who makes the purchase, and the second user 102B, whose payment mode is selected for making the purchase, as the first user 102A gets the incentive and the second user 102B earns a profit based on the second offer amount demanded by the second user 102B. Further, the method and system are beneficial for the issuers of the payment modes and the merchants, and an entity (such as payment networks, issuer banks, or third-party servers) that offers the payment mode interchange service as it increases their business, for example, in terms of the overall revenue generated based on such transactions.

Figure 13:
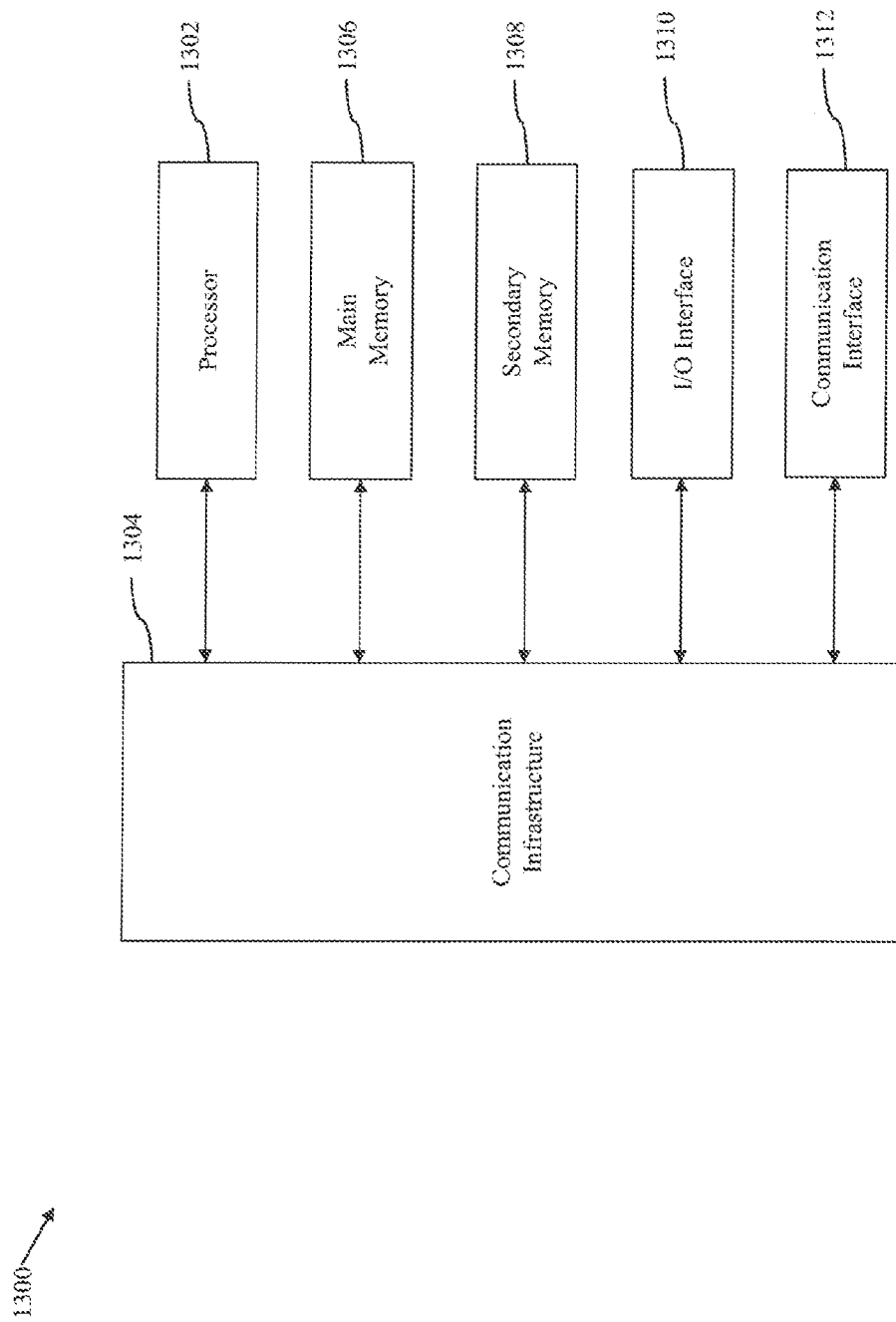
FIG. 13 is a block diagram that illustrates system architecture of a computer system, in accordance with an embodiment of the present invention.

FIG. 13 represents a block diagram that illustrates system architecture of a computer system 1300, in accordance with an embodiment of the present invention. An embodiment of the present invention, or portions thereof, may be implemented as computer readable code on the computer system 1300. In one example, the merchant server 106, the acquirer server 108, the payment network server 110, the first and second issuer servers 112A and 112B, and the first and second e-wallet servers 114A and 114B of FIG. 1 may be implemented in the computer system 1300 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 10, 11A and 11B, and 12.

The computer system 1300 includes a processor 1302 that may be a special-purpose or a general-purpose processing device. The processor 1302 may be a single processor, multiple processors, or combinations thereof. The processor 1302 may have one or more processor cores. In one example, the processor 1302 is an octa-core processor. Further, the processor 1302 may be connected to a communication infrastructure 1304, such as a bus, message queue, multi-core message-passing scheme, and the like. The computer system 1300 may further include a main memory 1306 and a secondary memory 1308. Examples of the main memory 1306 may include RAM, ROM, and the like. In one embodiment, the main memory 1306 is the first memory 204 or the second memory 304. The secondary memory 1308 may include a hard disk drive or a removable storage drive, such as a floppy disk drive, a magnetic tape drive, a compact disc, an optical disk drive, a flash memory, and the like. Further, the removable storage drive may read from and/or write to a removable storage device in a manner known in the art. In one example, if the removable storage drive is a compact disc drive, the removable storage device may be a compact disc. In an embodiment, the removable storage unit may be a non-transitory computer readable recording media.

The computer system 1300 further includes an input/output (I/O) interface 1310 and a communication interface 1312. The I/O interface 1310 includes various input and output devices that are configured to communicate with the processor 1302. Examples of the input devices may include a keyboard, a mouse, a joystick, a touchscreen, a microphone, and the like. Examples of the output devices may include a display screen, a speaker, headphones, and the like. The communication interface 1312 may be configured to allow data to be transferred between the computer system 1300 and various devices that are communicatively coupled to the computer system 1300. Examples of the communication interface 1312 may include a modem, a network interface, i.e., an Ethernet card, a communications port, and the like. Data transferred via the communication interface 1312 may correspond to signals, such as electronic, electromagnetic, optical, or other signals as will be apparent to a person skilled in the art. The signals may travel via a communications channel (not shown) which may be configured to transmit the signals to devices that are communicatively coupled to the computer system 1300. Examples of the communications channel may include, but are not limited to, cable, fiber optics, a phone line, a cellular phone link, a radio frequency link, and the like.

Computer program medium and computer usable medium may refer to memories, such as the main memory 1306 and the secondary memory 1308, which may be a semiconductor memory such as a DRAM. These computer program mediums may provide data that enables the computer system 1300 to implement the methods illustrated in FIGS. 10, 11A and 11B, and 12. In an embodiment, the present invention is implemented using a computer implemented application that may be stored in a computer program product and loaded into the computer system 1300 using the removable storage drive or the hard disc drive in the secondary memory 1308, the I/O interface 1310, or communication interface 1312.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor such as the processor 1302 and a memory such as the main memory 1306 and the secondary memory 1308 implements the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Techniques consistent with the present invention provide, among other features, systems and methods for facilitating electronic transactions for online purchases. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

What is claimed is:

1. A computer system comprising:
   a processor; and
   a memory coupled to said processor, said memory including computer executable instructions stored thereon that, when executed by the processor, cause the processor to perform the operations of:
   presenting a catalogue of items to a first user by way of a user interface rendered on a user device of the first user;
   receiving details of a selected item of the catalogue of items from the user device, the details including a purchase amount of the selected item and a merchant offer offered by a merchant on a sale of the selected item;
   determining that the merchant offer is not applicable to a first payment mode of the first user;
   identifying a plurality of payment options associated with a plurality of additional payment modes of a plurality of additional users to which the merchant offer is applicable, the plurality of additional payment modes of a plurality of additional users including a second payment mode of a second user and a third payment mode of a third user;
   presenting the plurality of payment options to the first user by way of the user interface rendered on the user device, each payment option being associated with an offer amount and one of each additional payment mode of each additional user, respectively, wherein the plurality of payment options are selectable by the first user;
   receiving, from the user device, a selection that corresponds to a first payment option of the plurality of payment options, wherein the first payment option is associated with a first offer amount and the second payment mode of the second user;
   transmitting, to the user device, an authorization request message to charge the first offer amount to the first payment mode of the first user for using the second payment mode of the second user;
   receiving, from the user device, a response message declining the request to charge the first offer amount to the first payment mode;
   in response to the response message, prompting the first user to select a second payment option from the plurality of payment options by way of the user interface;
   receiving, from the user device, a selection that corresponds to the second payment option of the plurality of payment options, wherein the second payment option is associated with a second offer amount and the third payment mode of the third user; and
   initiating a transaction from the third payment mode of the third user for billing the purchase amount on the third payment mode, wherein the third user receives the second offer amount from the first payment mode and the first user receives the merchant offer.

2. The computer system of claim 1, the computer executable instructions further causing the processor to perform the operation of registering a plurality of payment modes of a plurality of users based on a plurality of registration requests from the plurality of users, respectively, wherein the plurality of users include at least the first, second, and third users, and wherein the plurality of payment modes include the plurality of additional payment modes and the first payment mode of the first user.

3. The computer system of claim 2, wherein a registration request of the plurality of registration requests includes details of a payment mode that is to be registered and a block amount.

4. The computer system of claim 3, the computer executable instructions further causing the processor to perform the operation of allocating a digital currency amount equivalent to the block amount based on the registration request.

5. The computer system of claim 1, the computer executable instructions further causing the processor to perform the operation of receiving a first request from the user device for presenting the plurality of payment options for a purchase, wherein the first request includes a user-defined criterion.

6. The computer system of claim 5, wherein the user-defined criterion includes one of a type, a category, or a brand of a payment mode on which the merchant offer associated with the purchase is applicable.

7. The computer system of claim 6, wherein the merchant offer includes an incentive offered by the merchant on at least one of the type, the category, or the brand of the payment mode, and wherein the incentive includes at least a cashback, a discount, one or more reward points, or one or more loyalty points.

8. The computer system of claim 1, wherein each payment mode of the plurality of payment modes is one of a transaction card or an electronic wallet.

9. The computer system of claim 1, wherein the second payment option indicates the second offer amount that the third user demands in exchange for paying the purchase amount from the third payment mode of the third user, and wherein the third user receives the second offer amount after a transaction for the sale is complete.

10. The computer system of claim 1, the computer executable instructions further causing the processor to perform the operations of:
    transmitting, to the user device, a second authorization request message to charge the second offer amount to the first payment mode of the first user for using the third payment mode of the third user;

receiving, from the user device, a second response message approving the request to charge the second offer amount to the first payment mode; and charging the first payment mode of the first user with the second offer amount, based on the second response message.

11. The computer system of claim 1, the computer executable instructions further causing the processor to perform the operation of communicating a first permission request to the third user by way of a second user interface rendered on a second user device to obtain an approval for billing the purchase amount on the third payment mode of the third user, wherein the processor bills the purchase amount on the third payment mode of the third user based on approval from the third user.

12. The computer system of claim 1, wherein the computer system is one of the following: a payment network server, an issuer server, and a third-party server.

13. A system comprising:
a payment network server, comprising a processor and a memory, the memory having computer executable instructions stored thereon that, when executed by the processor, cause the processor to:
present a catalogue of items to a first user by way of a user interface rendered on a first user device of the first user;
receive details of a selected item of the catalogue of items from the first user device, the details including a purchase amount of the selected item and a merchant offer offered by a merchant on a sale of the selected item;
determine that the merchant offer is not applicable to a first payment mode of the first user;
identify a plurality of payment options associated with a plurality of additional payment modes of a plurality of additional users to which the merchant offer is applicable, the plurality of additional payment modes of a plurality of additional users including a second payment mode of a second user and a third payment mode of a third user;
present the plurality of payment options to the first user by way of the user interface rendered on the first user device, each payment option being associated with an offer amount and one of each additional payment mode of each additional user, respectively, wherein the plurality of payment options are selectable by the first user;
receive a selection that corresponds to a first payment option of the plurality of payment options from the first user device, wherein the first payment option is associated with a first offer amount and the second payment mode of the second user;
transmit a permission request message to a second user device of the second user, the permission request message including the purchase amount of the selected item and a request to charge purchase amount to the second payment mode of the second user;
receiving, from the second user device, a response message declining the request to charge the purchase amount to the second payment mode;
in response to the response message, prompting the first user to select a second payment option from the plurality of payment options by way of the user interface;

receiving, from the first user device, a selection that corresponds to the second payment option of the plurality of payment options, wherein the second payment option is associated with a second offer amount and the third payment mode of the third user; and initiating a transaction from the third payment mode of the third user for billing the purchase amount on the third payment mode, wherein the third user receives the second offer amount from the first payment mode and the first user receives the merchant offer.

14. The system of claim 13, the computer executable instructions further comprising causing the processor to register a plurality of payment modes of a plurality of users based on a plurality of registration requests from the plurality of users, respectively, wherein the plurality of users include at least the first, second, and third users, and wherein the plurality of payment modes include the plurality of additional payment modes and the first payment mode of the first user.

15. The system of claim 14, wherein a registration request of the plurality of registration requests includes details of a payment mode that is to be registered and a block amount.

16. The system of claim 13, the computer executable instructions further comprising causing the processor to receive a first request from the first user device for presenting the plurality of payment options, wherein the first request includes a user-defined criterion, and wherein the user-defined criterion includes one of a type, a category, or a brand of a payment mode on which the merchant offer associated with a purchase is applicable.

17. The system of claim 16, wherein the merchant offer associated with the purchase includes an incentive offered by the merchant on at least one of the type, the category, or the brand of the payment mode, and wherein the incentive includes at least a cashback, a discount, one or more reward points, or one or more loyalty points.

18. The system of claim 13, wherein each payment mode of the plurality of payment modes is one of a transaction card or an electronic wallet.

19. The system of claim 13, wherein the second payment option indicates the second offer amount that the third user demands in exchange for paying the purchase amount from the third payment mode of the third user, and wherein the third user receives the second offer amount after a transaction for the sale is complete.

20. The system of claim 13, the computer executable instructions further comprising causing the processor to:
transmit a second permission request message to a third user device of the third user, the second permission request message including the purchase amount of the selected item and a request to charge purchase amount to the third payment mode of the third user;
receive, from the third user device, a second response message approving the permission request to charge the purchase amount to the third payment mode;
charge the first payment mode of the first user with the second offer amount; and
charge the third payment mode of the third user with the purchase amount, based on the second response message.

* * * * *